US008575911B2

(12) United States Patent
Cheng et al.

(10) Patent No.: US 8,575,911 B2
(45) Date of Patent: Nov. 5, 2013

(54) DIGITAL HYBRID $V^2$ CONTROL FOR BUCK CONVERTERS

(75) Inventors: Kuang-Yao Cheng, Blacksburg, VA (US); Feng Yu, Blacksburg, VA (US); Paolo Mattavelli, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 118 days.

(21) Appl. No.: 12/855,097

(22) Filed: Aug. 12, 2010

(65) Prior Publication Data

US 2011/0316508 A1  Dec. 29, 2011

Related U.S. Application Data

(60) Provisional application No. 61/359,087, filed on Jun. 28, 2010.

(51) Int. Cl.
*G05F 1/00* (2006.01)
(52) U.S. Cl.
USPC ........................................................ 323/283
(58) Field of Classification Search
USPC ......... 323/282–285, 322, 234, 241–242, 281, 323/288, 326; 363/21.05, 21.13
See application file for complete search history.

(56) References Cited

U.S. PATENT DOCUMENTS

| | | | |
|---|---|---|---|
| 5,642,067 A * | 6/1997 | Grace | 327/134 |
| 7,705,577 B2 * | 4/2010 | Li et al. | 323/283 |
| 2008/0182391 A1 * | 7/2008 | Kahen | 438/479 |
| 2008/0252277 A1 * | 10/2008 | Sase et al. | 323/283 |
| 2008/0310236 A1 * | 12/2008 | Baker | 365/185.21 |
| 2009/0268491 A1 * | 10/2009 | Wilson | 363/78 |
| 2009/0326692 A1 * | 12/2009 | Lin et al. | 700/94 |
| 2011/0080191 A1 * | 4/2011 | Patel et al. | 327/105 |

* cited by examiner

*Primary Examiner* — Adolf Berhane
*Assistant Examiner* — Jeffrey Gblende
(74) *Attorney, Agent, or Firm* — Witham, Curtis, Christofferson & Cook, P.C.

(57) ABSTRACT

Stabilization of a switching voltage regulator employing $V^2$ control against ripple oscillation instability when the equivalent series resistance (ESR) of an output capacitor is small is provided by providing both an external ramp and an internal ramp (only the latter of which requires an approximation of inductor current) in the control feedback path, preferably including both inner and outer feedback loops. Approximation of inductor current using such an arrangement is non-critical and may be estimated based on power input voltage. Drift of a circuit providing such an inductor current estimation is preferably avoided by adjusting control duty cycle or slew rate of the positive-going ramp portion of the estimated inductor current triangular waveform.

14 Claims, 18 Drawing Sheets

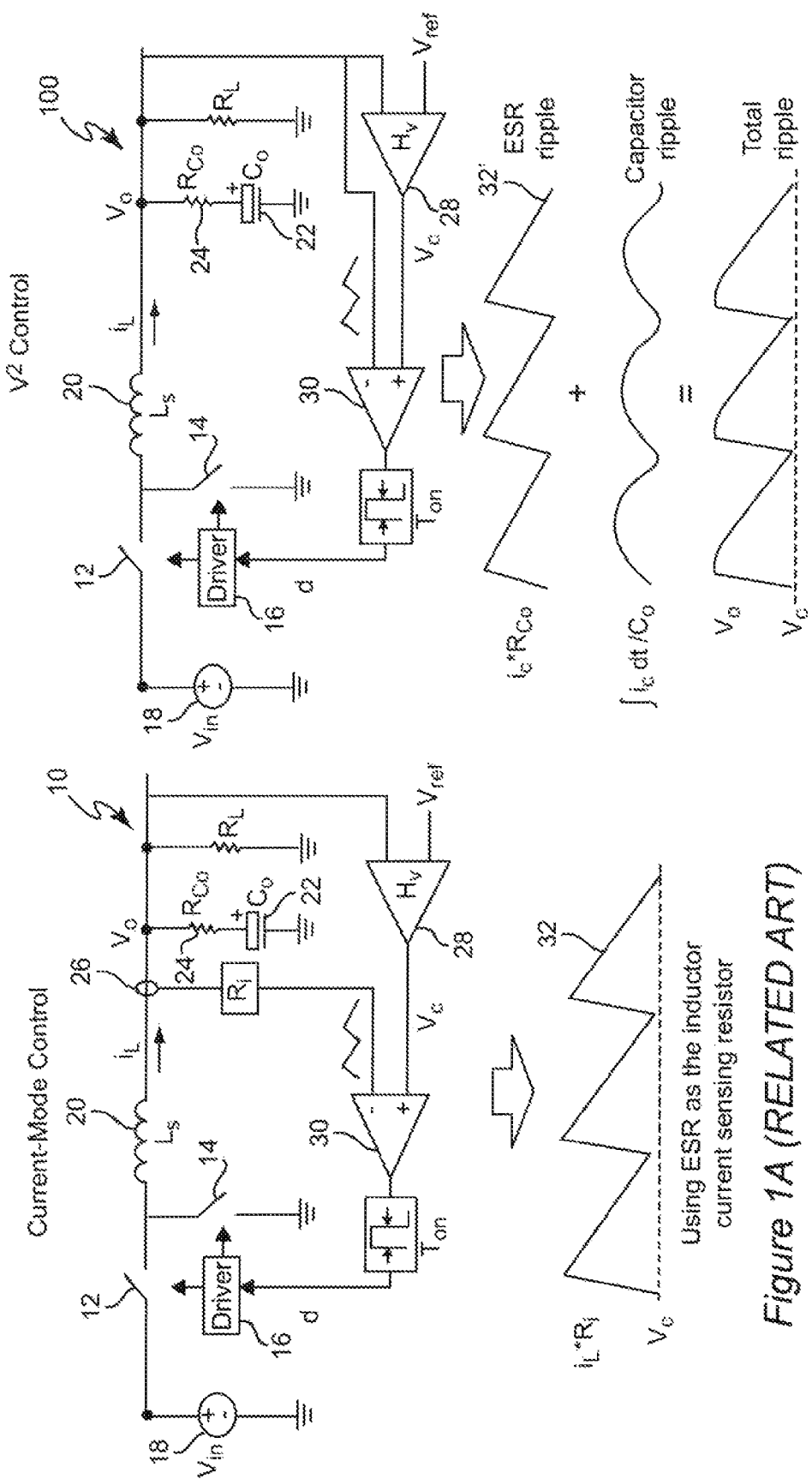

DIGITAL HYBRID $V^2$ CONTROL FOR BUCK CONVERTERS

CROSS-REFERENCE TO RELATED APPLICATIONS

This application claims priority of U.S. Provisional Patent Application Ser. No. 61/359,087, filed Jun. 28, 2010, which is hereby incorporated by reference herein in its entirety.

FIELD OF THE INVENTION

The present invention generally relates to DC/DC converters and voltage regulating switching power supplies and modules and, more particularly, to power supplies and modules employing $V^2$ control and having output capacitances having small equivalent series resistance (ESR).

BACKGROUND OF THE INVENTION

The majority of current and foreseeable electronic devices are designed to operate using direct current (DC) power at a voltage which is substantially constant and often, particularly for modern digital circuits which may be formed as integrated circuits of high integration density, must be very closely regulated even when subject to large changes in load current. To provide such regulation, many different voltage converter topologies have been developed. Of these various topologies the so-called buck converter has become very widely used due to its simplicity and the small number of elements required; essentially two switches, an inductor and an output filter capacitor, which lead to the highly desirable characteristics of low cost and high power density.

A buck converter is characterized by having an inductor in series with the load and switches that conduct in a complementary fashion such that when the inductor is connected to the power input, the increasing current in the inductor causes a voltage which is opposite to or "bucks" the input voltage while, when the inductor is disconnected from the input power, decreasing current, referred to as freewheel current, supplied through the other switch causes a voltage which supplies additional current to the load. Of course, such a mode of operation causes a voltage ripple (hereinafter referred to as an inductor ripple) which varies in magnitude with the current drawn by the load and generally must be filtered by a large capacitance. As current is drawn by the load and the capacitor is alternately charged by current from the inductor and discharged to the load, a ripple voltage (referred to hereinafter as capacitor ripple) will appear across the capacitor. The magnitude of the capacitor ripple will be determined by the value of the filter capacitor and the amount of current drawn by the load. The regulated output voltage is determined by the relative duty cycles of the two switches which is usually controlled by a feedback arrangement from the converter output or the point of load (POL).

However, the response to changes in load of a buck converter is less than ideal and load transients have been generally accommodated by the filter capacitor during the short period required to adjust the duty cycle of the switches to provide more current through the inductor. Thus a large value of the filter capacitor has been desirable to limit voltage reduction when load current increases as well as to limit capacitor ripple. Particularly severe load transients are characteristic of digital logic circuits such as processors capable of operating at high clock speeds. More recently, stringent voltage regulation specifications have required provision of filter capacitors at the point of load where the size of the filter capacitor becomes relatively critical and limits the capacitance value that can be provided. Thus, to improve transient response of buck converters such that the filter capacitance may be decreased, a so-called $V^2$ control architecture has been developed and is favored due to its simplicity and ease of implementation as well as its effectiveness in increasing transient response.

The basic concept of $V^2$ control is to sense the current drawn by the load and provide that current information in addition to the output voltage information as feedback to control the duty cycle of the switches so that control can be asserted more rapidly and strongly at the onset of increased load current draw. Such a control architecture has conveniently used the equivalent series resistance (ESR) of the filter capacitor as a current sensor. Since current sensing is difficult, particularly at high current and low voltage, the equivalent series resistance (ESR) of the filter capacitor has been used as a small resistor for sensing inductor current. However, smaller and higher quality (e.g. ceramic) capacitors such as are used at the point of load have a much smaller ESR than large filter capacitors capable of accommodating large load transients as alluded to above. Thus the total ripple waveform appearing at the inductor output and the power converter output and comprising inductor ripple and capacitor ripple components (which differ in waveform and phase) possibly in somewhat different proportions (e.g. if they are obtained at different locations in the circuit having non-ideal conductors even if schematically depicted as the same node) is fed back to control the switches.

However, with capacitors that exhibit a very small ESR, the $V^2$ control architecture suffers from pulse-skipping oscillation instability which, as will be discussed in greater detail below, occurs at large load current when the capacitor ripple becomes dominant in the total ripple waveform, particularly in view of the reduced inductor ripple voltage developed when the ESR of the filter capacitor is small. Several strategies have been developed to eliminate this instability but generally require substantial complexity and critical tuning, even using analog circuits.

At the current state of the art, however, it has become popular to utilize digital control techniques in power converter control since digital circuits provide the advantages of noise immunity, the capability of being re-programmed, automatic tuning and efficiency optimization. However, for a digital implementation of a $V^2$ control architecture, high sampling rate high resolution analog-to-digital (A/D) converters are required to avoid so-called limit cycle oscillation that may result from more coarse quantization of the output voltage of the converter. Suitable A/D converters may also be susceptible to high frequency noise. These and other difficulties and complexities have made a digital implementation of a $V^2$ control architecture for power converters, and buck converters in particular, highly impractical.

SUMMARY OF THE INVENTION

It is therefore an object of the present invention to provide a practical, digitally implemented $V^2$ control architecture, particularly for buck converters.

It is another object of the invention to provide a technique and circuit for avoiding pulse skipping oscillation instability without the drawbacks of known techniques and circuits and which can be achieved without inductor current sensing.

It is a further object of the invention to provide a power converter having a $V^2$ control architecture of improved transient response without requiring high sampling rate or high resolution A/D converters.

In order to accomplish these and other objects of the invention, a switched power converter is provided comprising switches for supplying input voltage power to an inductor, and a feedback circuit for controlling the switches in accordance with a signal representing an output voltage of the power converter, the feedback circuit comprising an external ramp generator for adding a first ramp waveform to the signal representing the output voltage, the first ramp waveform having a slope which produces approximately unity gain of the power converter at a switching frequency above a frequency causing a peak in gain of the power converter, and an internal ramp generator for adding a second ramp waveform to the signal representing the output voltage, the second ramp waveform having a magnitude which produces approximately unity gain of the power converter at a switching frequency above a frequency above a frequency causing a minimum in gain of the power converter. The internal ramp generator may be a circuit for estimating inductor current without any measurement thereof.

In accordance with another aspect of the invention, a triangular waveform generator is provided comprising a multiplexer and a low pass filter, the multiplexer providing an input parameter value or a substantially fixed value to the low pass filter in accordance with a control signal, wherein a level of the triangular waveform is adjusted by comparison of a value of the waveform at a detected minimum thereof with a reference value to compensate for drift.

BRIEF DESCRIPTION OF THE DRAWINGS

The foregoing and other objects; aspects and advantages will be better understood from the following detailed description of a preferred embodiment of the invention with reference to the drawings, in which:

FIGS. 1A and 1B contrast a current mode control architecture and a $V^2$ control architecture for buck converters.

DETAILED DESCRIPTION OF A PREFERRED EMBODIMENT OF THE INVENTION

Figure 2A:
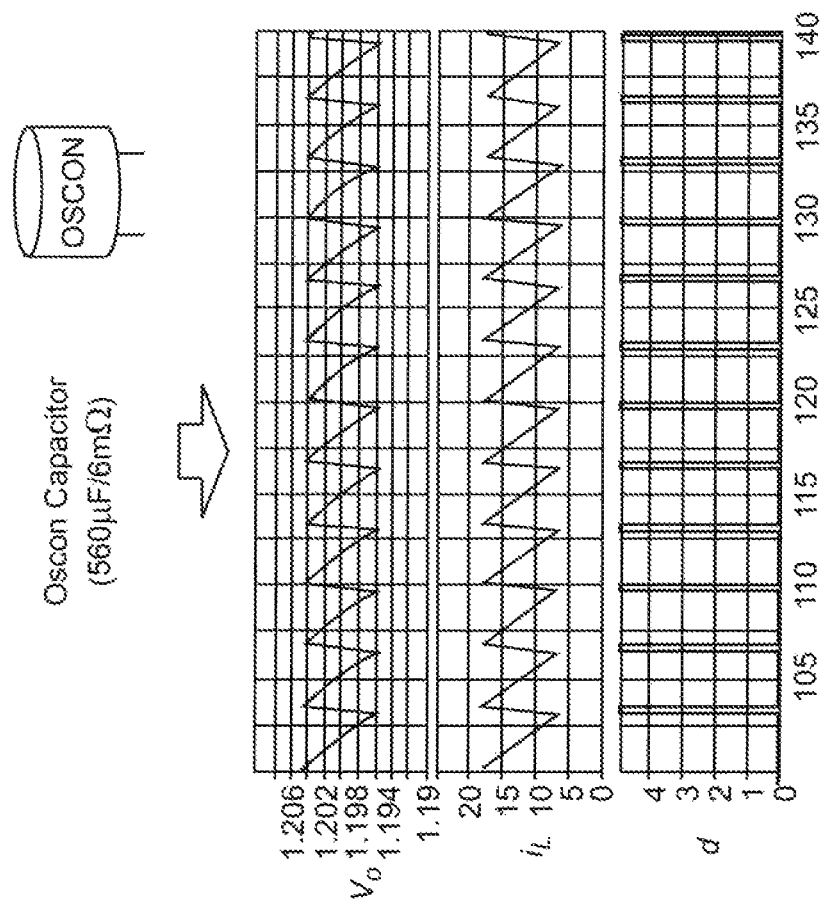
FIGS. 2A and 2B illustrate the pulse skipping oscillation instability at large load using a $V^2$ control architecture and capacitor ESR as a current sensor as the ESR becomes small.
Figure 2B:
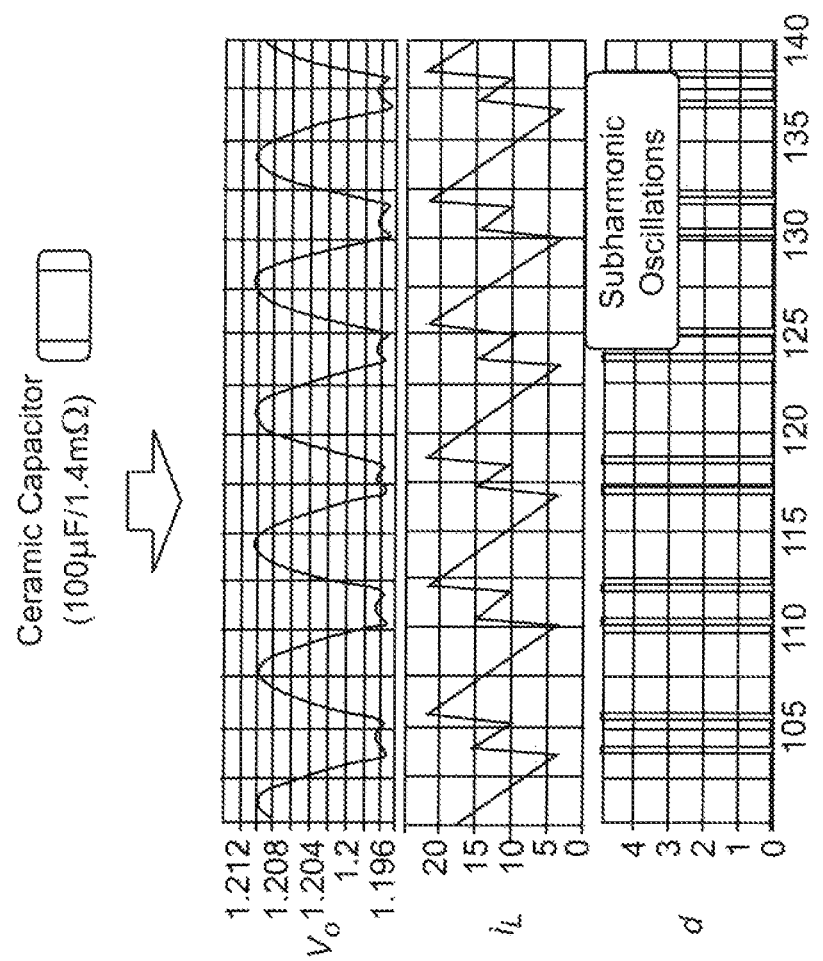

Referring now to the drawings, and more particularly to FIGS. 1A and 1B, schematic diagrams of buck converters respectively having current-mode control and $V^2$ control are shown. These schematic diagrams are arranged to facilitate an understanding of and appreciation for the invention and no portion of either Figure or FIGS. 2A and 2B is admitted to be prior art in regard to the present invention. It should also be understood that while the invention will be described in connection with a buck converter, the invention is also applicable to other switching power converter topologies. Similarly, for simplicity and to facilitate conveying an understanding of the invention and the problems addressed by it, the invention will be described assuming a constant on-time switching arrangement although the invention is not limited to such an application and constant off-time, constant frequency or other switching schemes or any combination thereof can be employed in the practice of the invention.

In a constant on-time switching arrangement with simple and basic voltage regulation, a pulse of a constant width is applied when current drawn by the load causes the converter output voltage to fall below the nominal regulated voltage desired. The pulse of current from the power input to the converter thus replaces the current drawn and recharges the filter capacitor to the desired voltage. Thus the frequency of the switching cycle is approximately proportional to the current drawn by the load. Since the voltage must be drawn down and there is a finite feedback signal propagation time and finite response time of the circuit driving the switches, the transient response cannot be ideal and a large increase in load current can thus cause a substantial and possibly unacceptable reduction in output voltage for a short time following the increase in load current. The same type of effect also can occur when load current decreases. Both effects cause a sharp change in the current through the inductor of the power converter. Thus, to improve transient response time of the converter, the inductor current can be monitored and fed back to the switch driver circuit (often through a much shorter connection) to adjust switching frequency or otherwise adjust duty cycle to increase or decrease the current delivered with reduced voltage fluctuation. Such additional control based on direct sensing of inductor current is generally referred to as current-mode control.

A generalized buck converter 10 with current-mode control is schematically, depicted in FIG. 1A. As alluded to above, a buck converter includes a switch 12, sometime referred to as a top switch, and a switch 14, sometimes referred to as a bottom switch, which are operated in a complementary fashion by a driver circuit 16 such that the input power supply 18 is periodically connected to inductor 20. That is, when switch 12 is closed, current $I_L$ will flow in inductor 20 to filter capacitor 22 which is depicted as including an equivalent series resistance (ESR) 24, depicted as Rco and also to the load $R_L$. As alluded to above, as the current increases, a voltage will be developed across inductor 20 that opposes (or "bucks" in the exemplary buck converter topology illustrated) the increase in current and the voltage of the input power source. When switch 12 is subsequently opened and switch 14 closed, the decreasing current develops a voltage across the inductor that continues to deliver current to the filter capacitor 22 and the load. The current into and out of the capacitor 22 is also affected by the voltage drop the current causes across ESR 24. The ESR value is on the order of six mΩ for a relatively large valued filter capacitor capable of filtering the inductor current ripple and accommodating load transients as alluded to above and is often considered to be negligible in regard to the overall function of the power converter.

Voltage regulation is provided in the buck converter by a connection from the converter output to an amplifier/comparator 28 which is also supplied with a reference voltage, $V_{ref}$, to develop a control voltage Vc to control switch driver 16. (Details of detector 26 and driver 16 are unimportant to the successful practice of the invention and suitable arrangements will be apparent to those skilled in the art.) To improve transient response of this feedback circuit, the inductor current is also detected, possibly inductively, at sensor 26 and is also fed back to control driver 16 through a resistance Ri. This signal is essentially the inductor ripple which generally appears as a triangular waveform which is superimposed on control voltage Vc at amplifier 30. Thus, when load current increases or decreases suddenly, a corresponding change occurs in the inductor ripple and driver 16 can be controlled accordingly to deliver required current from the input power source 18 in advance of feedback of the output voltage through comparator/amplifier 28.

A buck converter having a $V^2$ control architecture is depicted in FIG. 1B. This circuit is substantially similar to that of FIG. 1A except that current sensor 26 is omitted. Instead, the voltage developed across ESR 24 is monitored and ESR 24 functions as a virtual current sensor. That is, as illustrated in FIG. 1B, the total ripple appearing in the output voltage is comprised of an ESR ripple voltage corresponding to the inductor ripple and a capacitor ripple voltage. (The same total ripple also appears in the circuit of FIG. 1A.) In this case, however, the output voltage is fed back in two separate feedback loops: one (a so-called outer loop) including the comparison with a reference voltage at amplifier/comparator 28 and the other (a so-called inner loop) to superimpose the total ripple (including the inductor ripple component) on the control voltage. It should be appreciated that if the filter capacitor 22 is of large value and exhibits a correspondingly significant ESR, the inductor ripple will generally dominate the capacitor ripple, even at relatively large loads.

The pulse-skipping oscillation instability alluded to above can be understood from FIGS. 2A and 2B. In FIG. 2A, corresponding to a 560 μF filter capacitor exhibiting an ESR of 6 mΩ, waveform d illustrates the narrow, constant duration square wave pulses applied to switch 12 and the rising portion of the inductor current ripple waveform corresponds to these pulses as shown in waveform $i_L$. The output voltage Vo also exhibits a total ripple similar to the inductor ripple as is also depicted in FIG. 1B. FIG. 2B corresponds to a smaller valued ceramic filter capacitor having a capacitance of 100 μF and exhibiting an ESR of 1.4 mΩ. Thus, for an inductor current having the same average value as that of FIG. 2A, the voltage developed across the ESR of the capacitor will be less than one-quarter of that developed by the capacitor corresponding to FIG. 2A during normal operation. Further, the capacitor ripple is a function of both the load current and the filter capacitor value; the capacitor ripple increasing with decreasing capacitor value. Thus, even a moderate load current can cause the capacitor ripple to dominate the inductor ripple since the value and ESR of the filter capacitor are both reduced. As illustrated in FIG. 2B, the large total ripple having a waveform similar to that of the capacitor ripple component illustrated in FIG. 1B causes additional switch driver pulses to be generated corresponding to the two minima in Vo and other pulses to be skipped, resulting in subharmonic oscillations. This instability effect is also aggravated by the fact that, as the load current increases, the phase of the output voltage ripple is progressively delayed relative to the phase of the inductor ripple. The phase delay is also increased in digital circuits by the process of sampling Vo as shown by Vo_k in FIG. 3C, particularly as switching frequency increases (relative to a constant sampling rate) as occurs to deliver increased current in constant on-time switching arrangements and, in any case, requires a high sampling frequency.

Since the oscillation instability is caused by the capacitor ripple becoming dominant over the substantially triangular inductor ripple waveform, it would seem logical to assume that the oscillation instability could be corrected by adding a ramp signal in the feedback path of a magnitude which dominates the capacitor ripple. However, since the inductor current ripple is not available independently of the capacitor ripple when developed by the ESR of the filter capacitor, simple amplification of the inductor ripple is not available as a solution. Other known techniques of developing a ramp signal for avoiding the oscillation instability have not been entirely successful and have uniformly led to other problems which have proven intractable.

Figure 3A:
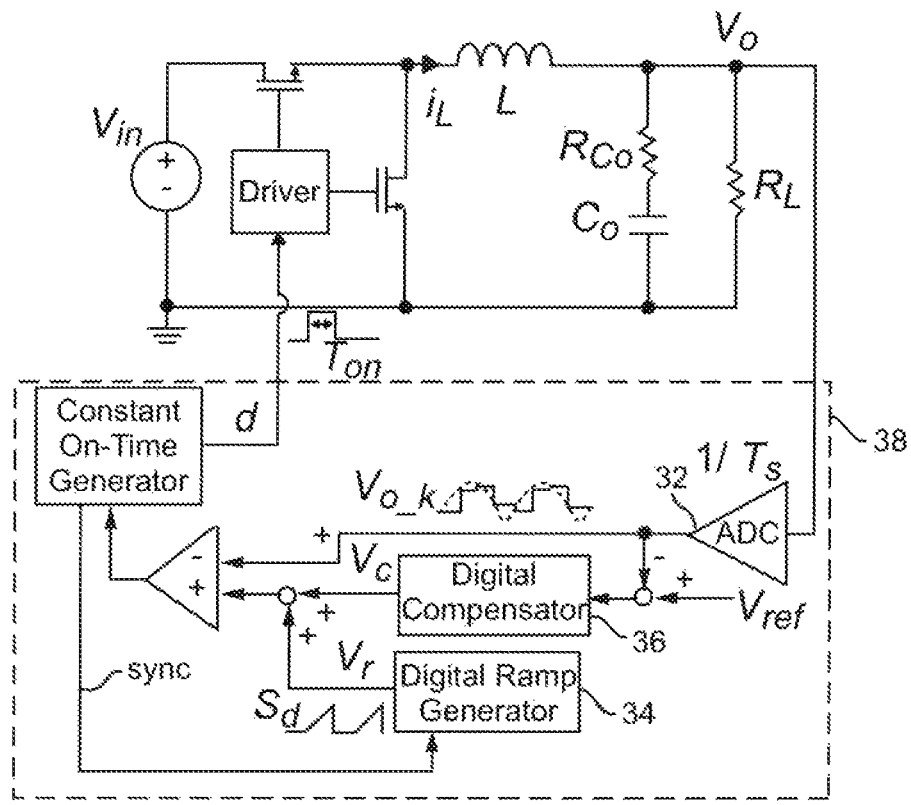
FIGS. 3A, 3B and 3C illustrate a known strategy for eliminating the pulse skipping oscillation instability illustrated in FIG. 2B, FIGS. 4A, 4B and 4C illustrate an alternative known strategy for eliminating the pulse skipping oscillation instability illustrated in FIG. 2B, FIGS. 5A, 5B and 5C illustrate a hybrid ramp compensation technique and circuit in accordance with a first embodiment of the invention, FIG. 6A schematically illustrates a hybrid ramp compensation technique and circuit with current estimation in accordance with a second embodiment of the invention, FIG. 6B schematically illustrated a preferred form of digital filter for use in the second embodiment of the invention.
Figure 3C:
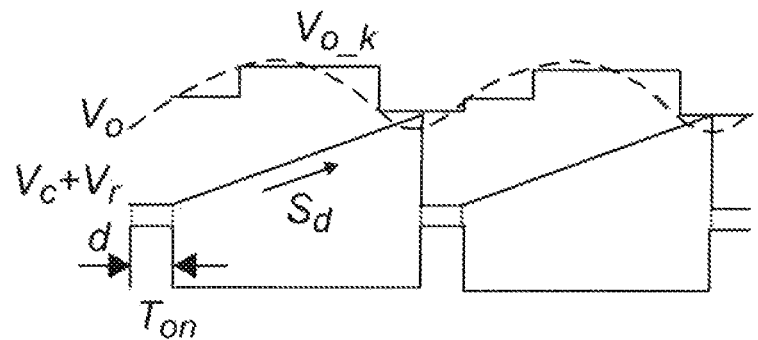

For example, FIG. 3A schematically illustrates a buck converter having a $V^2$ control architecture similar to that discussed above in connection with FIG. 1B. The circuit of FIG. 3A differs from that of FIG. 1B only in the control portion 38 and principally by inclusion of an analog-to-digital (A/D) converter 32 having a sampling frequency of 1/Ts, a digital compensator 36 which is essentially a digital gain control as will be discussed in greater detail below and an external (digital) ramp generator 34. The ramp generator 34 is referred to as external since it is not responsive to any signal internal to the power converter other than a synchronization signal that can be obtained from the (constant on-time) switch driver as well as to distinguish it from an internal ramp generator as will be discussed below. The external ramp generator produces a waveform which is of constant voltage during the on-time of the switch driver and then increases with a slope $s_d$ which may be chosen to be a multiple of slope $s_f=(Vo/L)R_{Co}$ where $R_{co}$ is the ESR of the capacitor and thus corresponds to the maximum falling slew rate found in the total ripple waveform. While this waveform is largely opposite to the triangular waveform of the inductor ripple, the falling edge is preferably arranged to occur at approximately the minimum of the total ripple waveform so that a pulse will be assured at that timing while premature pulses (that result in pulse-skipping) are prevented by the added voltage of the sloped portion of the waveform.

Figure 3B:
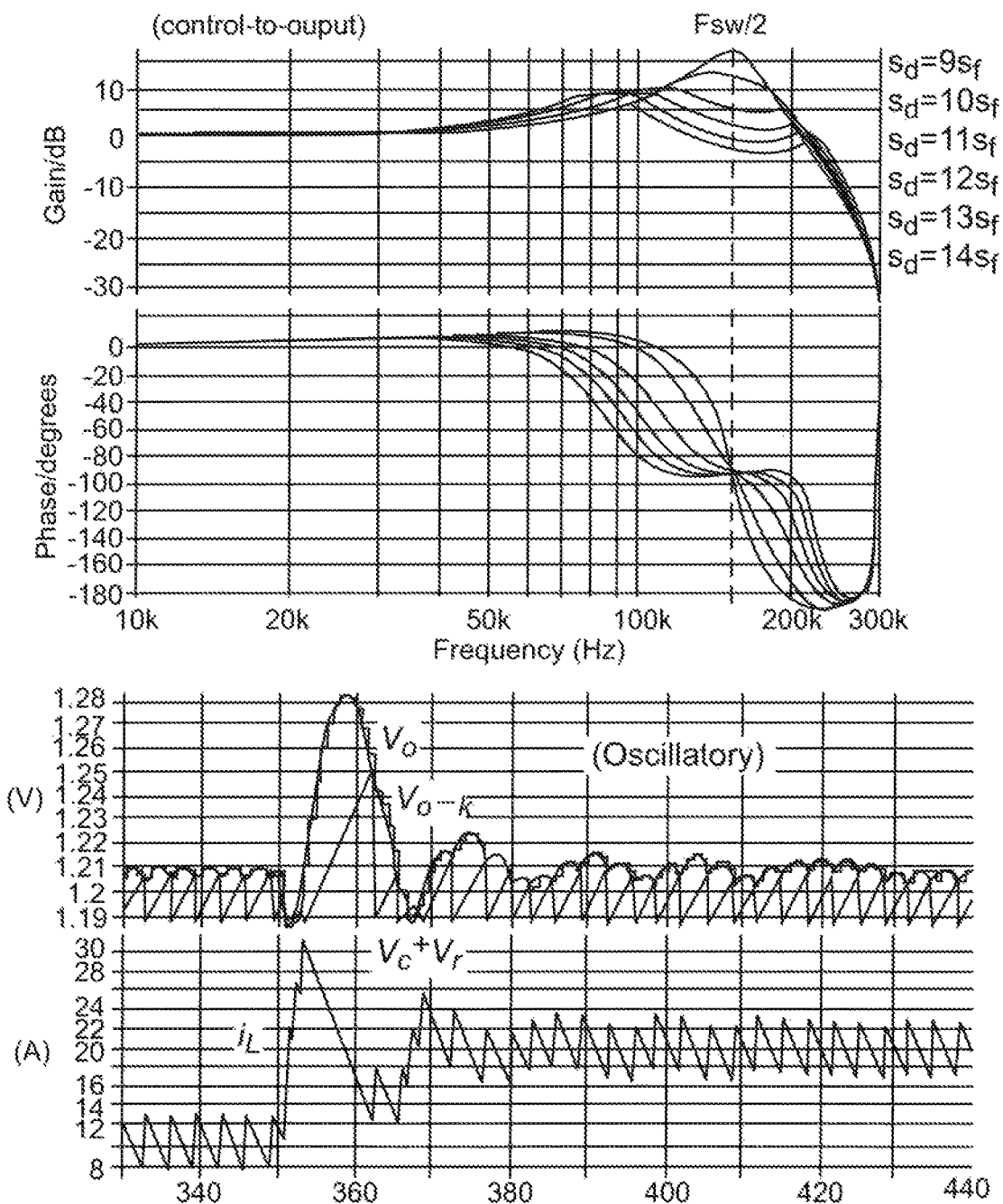

As may be expected, the slope $s_d$ is relatively critical as can be observed from FIG. 3B. Specifically, the gain varies substantially from zero db at one-half the nominal switching frequency and exhibits a substantial peak in gain unless $s_d \geq 12 s_f$ which compromises the accuracy of regulation that can be obtained and which becomes more severe as the slope is decreased. As the slope is increased, the peak divides into two separated peaks with reduced gain (e.g. a minimum) between them. In addition, use of a ramp generator having a fixed slew rate causes performance to vary with variation in input voltage and load transients. In fact, as shown in the lower curves of FIG. 3B, response to a load transient is excessive and causes oscillation in the output voltage even where $s_d$ is chosen to substantially limit gain variation and bring the gain to unity at the frequency where a peak would occur when a lesser slope is provided (e.g. $s_d=13s_f$). That is, to achieve avoidance of ripple oscillation instability, the slope of the external ramp must be large while increasing the slope causes peaking due to the low frequency double poles moving toward lower frequencies with increasing slope and more phase delay and lower phase margin at the loop bandwidth can be expected while DC regulation is increasingly compromised due to increased DC output impedance. Thus there is a trade-off between limiting gain variation and transient response. Therefore, while theoretically viable for avoiding ripple oscillation instability, this approach does not provide acceptable performance for a switching regulator.

Figure 4A:
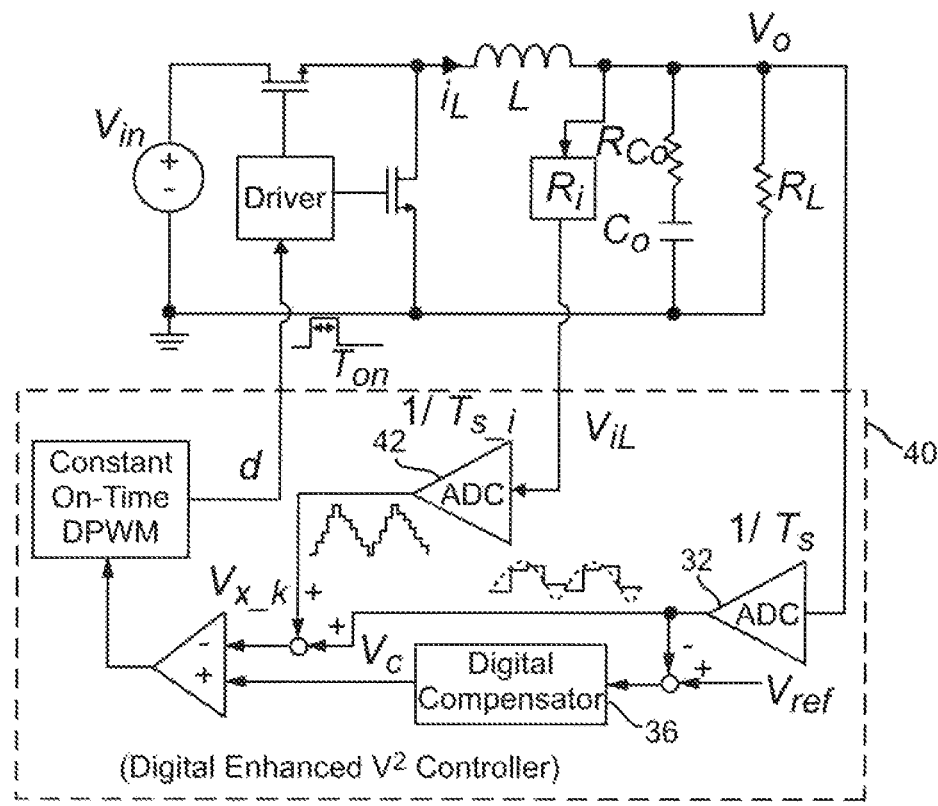

Another known approach to avoiding oscillation instability when the ESR of the filter capacitor is small using an internal ramp is illustrated schematically in FIG. 4A. Again, the circuit of FIG. 4A differs from that of FIG. 1B only in control portion 40 and use of current sensing. As with the circuit of FIG. 3A, the output voltage including the total output voltage ripple is digitized with an A/D converter, compared with a reference and digital compensation applied to obtain a control voltage Vc as well as being fed back to the switch driver through an inner feedback loop. However, in this approach, the inductor current is directly monitored using a sensing resistor or DC winding resistance (DCR) current sensing techniques collectively indicated schematically by $R_i$ which may be constituted by the equivalent resistance or DCR of the inductor. Thus the inductor ripple voltage can be substantially isolated and the relative phase lag of the total output ripple can be reduced. That is, the DCR behaves as a virtual ESR and, when large (or sufficiently increased), the total ripple will be dominated by the virtual ESR/DCR ripple. A digitized inductor ripple waveform can thus be fed back directly by combining it with the digitized total ripple waveform in the inner feedback loop.

An approximation of the inductor ripple containing all relevant inductor ripple information can also be obtained by taking a derivative of the output voltage. However, this technique suffers from distortion due to the existing ESR of the filter capacitor. Therefore a quadratic differential and integration technique based on the derivative output voltage has also been proposed to eliminate the distortion caused by the ESR and to obtain a linear current ramp proportional to the inductor current ramp which enhances the signal-to-noise ratio (SNR) of the sensing signal. However, such an approach involved an unacceptable level of complexity, cannot be implemented digitally without high sampling rate A/D converters and also may suffer from high frequency noise problems.

Figure 4C:
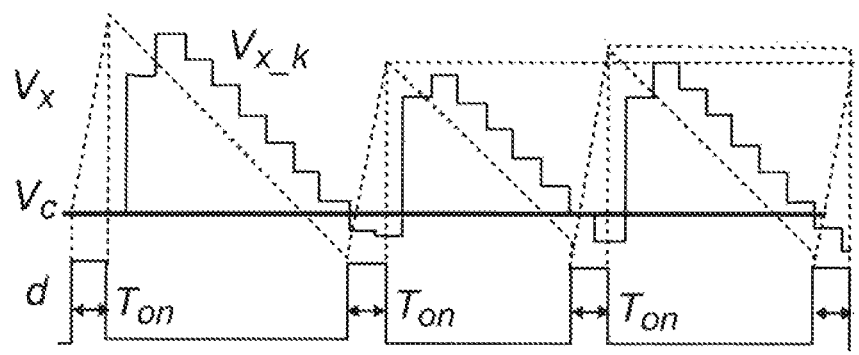
Figure 4B:
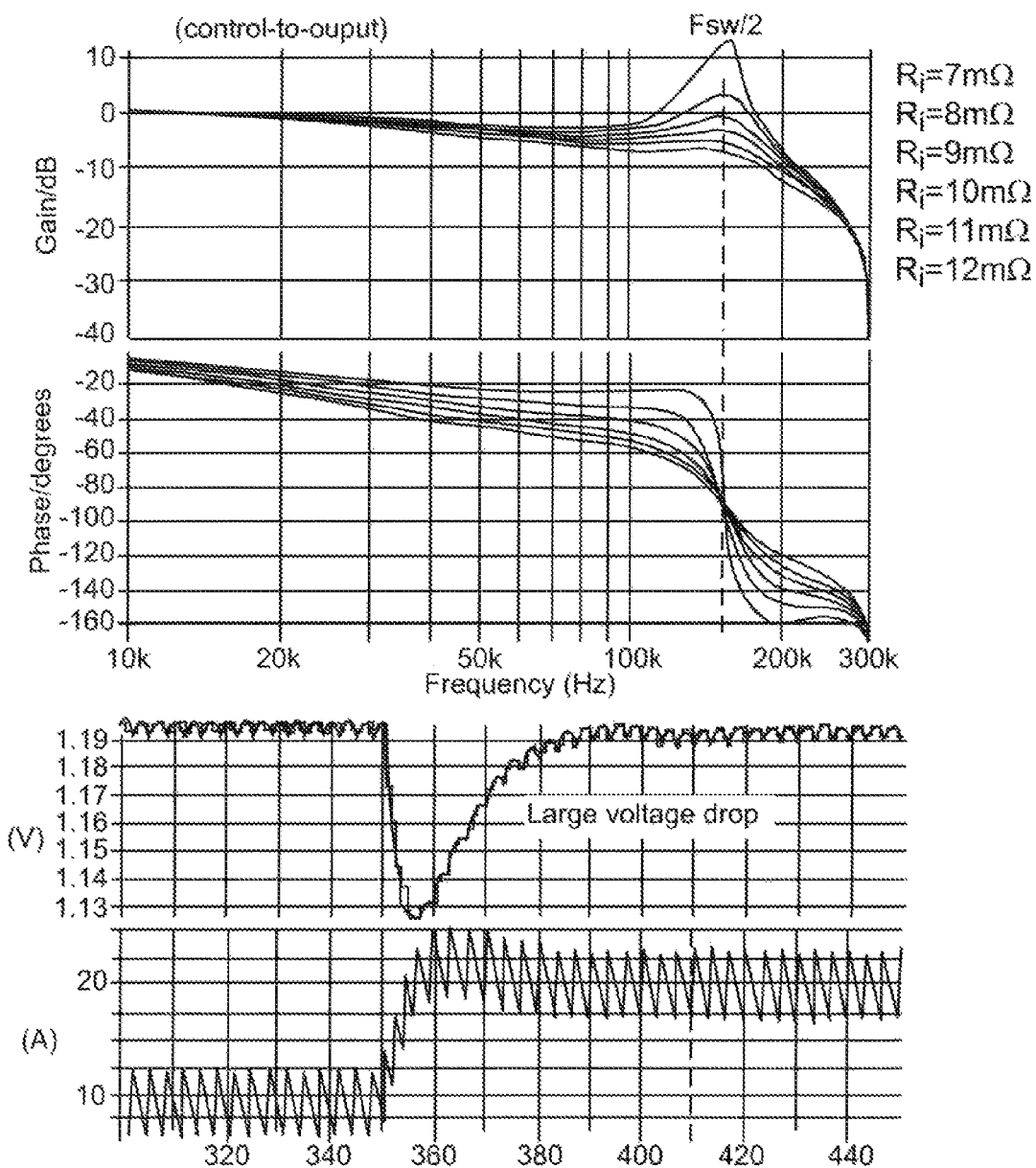

It has also been proposed to provide a digital $V^2$ control architecture using an adaptive ramp and current sensing feedback for enhancing the current ripple information. However A/D converters having high sampling rate and high resolution are still required for avoiding limit cycle oscillation. Moreover, as with the circuit of FIG. 3A, the use of an internal ramp based on inductor current and/or inductor ripple, however the internal ramp may be developed, to avoid the ripple oscillation instability unacceptably compromises the voltage regulation of the switched converter. As shown in FIG. 4B, the gain of the circuit of FIG. 4A deviates from unity over a broad frequency range and exhibits a sharp peak at one-half the nominal switching frequency. The severity of the peak increases as an additional equivalent resistance or DCR of the inductor decreases and thus may compromise the efficiency and current delivery capability of the converter. The phase lag of the output ripple relative to the inductor ripple varies even more sharply with frequency than when an external ramp is utilized. Further, load transients cause an unacceptably large voltage drop, usually causing a loss of required voltage regulation and the response to load transients is not well-damped; allowing a ringing oscillation in output voltage even when implemented in an analog fashion. In other words, the actual overall performance of the converter of FIG. 4A is significantly inferior to that of the converter of FIG. 3A. Further, when implemented digitally, the ramp is subject to so-called limit cycle oscillation due to quantization by A/D converter 42 as illustrated in FIG. 4C and thus requires the A/D converter to have both high sampling rate and high resolution. It should be understood that limit cycle oscillation is an entirely distinct phenomenon from the ripple oscillation instability discussed above and engenders a problem of current estimation drift which will be discussed in detail below.

Thus it is seen that none of the known techniques which are theoretically capable of avoiding ripple oscillation instability of $V^2$ control architectures when used with filter capacitors exhibiting small ESR are actually effective to do so and, moreover, unacceptably compromise the voltage regulation performance of switching regulators as well as adversely affecting transient response performance for the which $V^2$ control architecture might otherwise be desirably included. Further, the external ramp approach presents a criticality in ramp slope and the internal ramp approach requires additional complexity and actual monitoring of inductor current which, in itself, is impractically difficult in low voltage, high current applications as well as requiring high frequency sampling and high resolution if implemented digitally to reduce or avoid the effects of limit cycle oscillation of the output voltage.

Figure 5A:
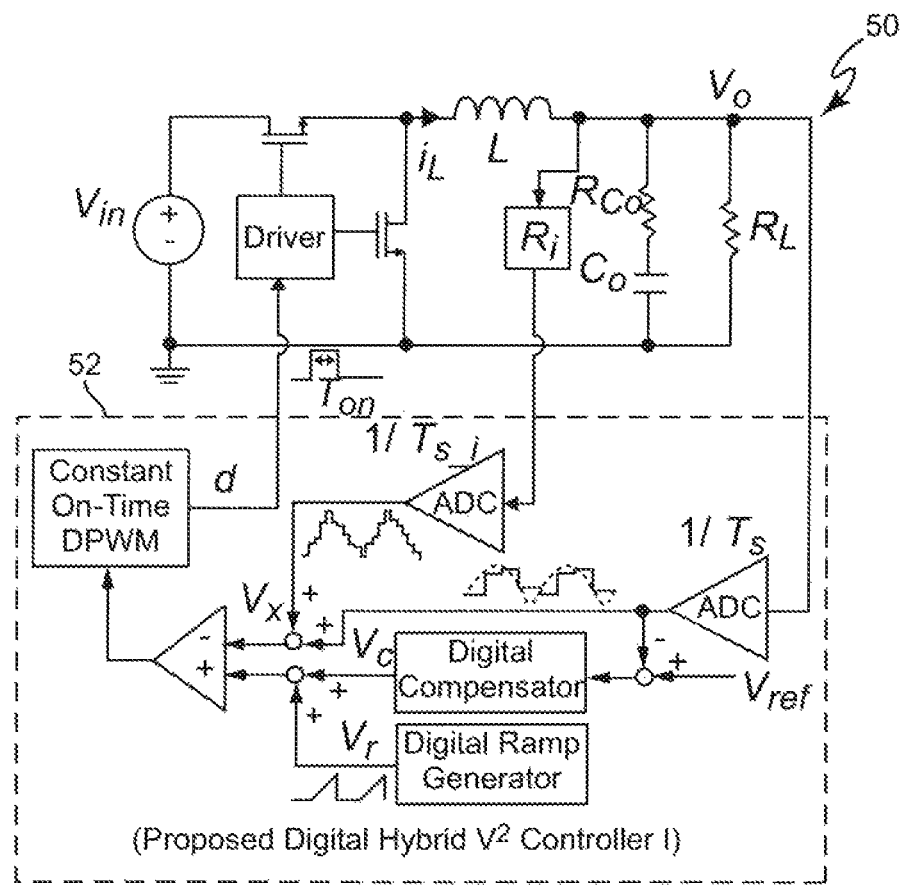
Figure 5B:
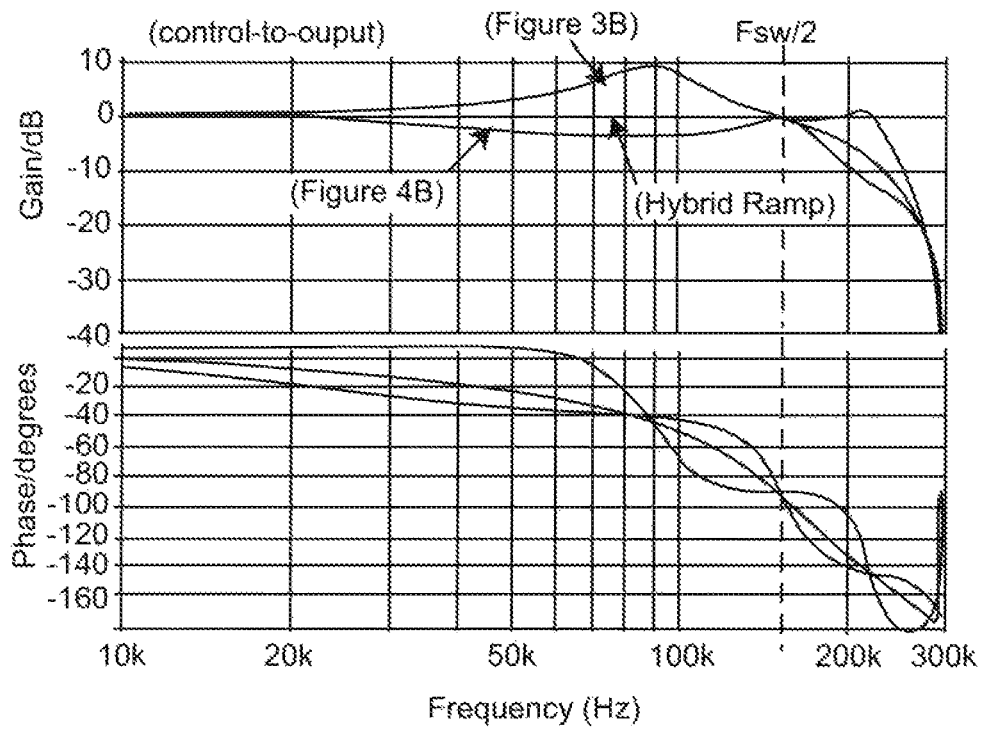
Figure 5C:
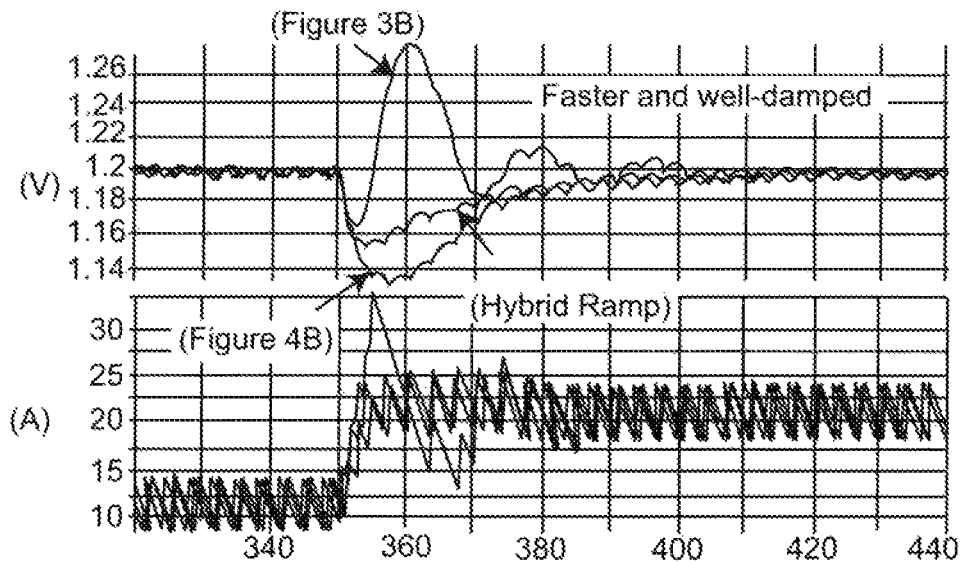

Referring now to FIG. 5A-5C, a first embodiment 50 of the invention will now be discussed. The buck converter portion of FIG. 5A is substantially the same as that described above in connection with FIGS. 1A, 1B, 3A and 4A. Superficially, the hybrid ramp compensation appears to be a combination of the external and internal ramp approaches to avoiding ripple oscillation instability discussed above in connection with FIGS. 3A and 4A. However, such a combination is, itself, counter-intuitive since either approach is theoretically capable of providing such an effect. Further, it would be expected that the problems associated with each of the external ramp and the internal ramp and which renders each such approach to be unacceptable and/or impractical would be aggregated in such a combination of unacceptable and/or impractical approaches. Through analysis, which will be detailed below, and confirmatory simulation or experiments, the inventors have discovered that such is not the case; providing greatly enhanced performance as well as solutions to problems engendered by both the external and internal ramp approaches individually and doing so in a manner which allows other simplifications and economies to be achieved as will be discussed below in regard to the second embodiment and perfecting feature of the invention.

As alluded to above, in the case of using an external ramp to avoid ripple oscillation instability when the ESR of the filter capacitor becomes small causes significant variation of converter gain from unity (0 db) at various frequencies. (The reduction of ESR cannot be directly compensated by adding a resistance in series with the capacitor since cost of a resistor of sufficiently small value would be prohibitive while severely degrading transient performance, particularly where capacitance value is also reduced. Conversely, while a larger ESR might generally be desirable, it is only tolerable in regard to load transients where the filter capacitance is sufficiently large.) However, the gain can be brought to unity or approximately unity at a given frequency (e.g. one-half the nominal switching frequency or at a frequency higher than a frequency causing a local maximum in power converter gain) by appropriate choice of the external slope. It was also alluded to above that when using an internal ramp to enhance inductor current ripple information, the equivalent resistance of the inductor could be chosen to bring the converter gain to unity at a given frequency (e.g. a frequency above that which will cause a local minimum in the power converter gain) even though the gain varies from unity at other frequencies and perhaps significantly so. In the embodiment of FIG. 5A, if the slope or magnitude of the external ramp is chosen to bring the gain to unity at a given frequency such as, for example, one-half the nominal switching frequency and the equivalent resistance of the inductor is chosen to bring the gain of the converter using an internal ramp to unity at the same frequency or substantially so, the variation of gain due to each of the internal and external ramps can be made to approximately cancel as shown in FIG. 5B and the gain of the converter of FIG. 5A can thus be made to have substantially unity gain to switching frequencies well above one-half the nominal switching frequency and close to the maximum design maximum switching frequency. Similarly, the difference in phase lag between the inductor ripple and total ripple may be made to increase only slowly over a wide range of switching frequency. Most importantly, however, the transient response is far smaller, much faster and is well damped as illustrated in FIG. 5C.

It is important to understand that it is not necessary to generate a unity gain up to a particular frequency since the outer loop compensator can be designed for gain compensation. The importance of generating unity gain up to one-half the nominal switching frequency is to provide a substantially constant output impedance characteristic. A constant output impedance is very important to the voltage regulation function, particularly for a voltage regulation module since good voltage regulation can then be achieved without complicated pole/zero placements. It is also important to observe that, if the internal ramp compensation is compared with the hybrid ramp compensation arrangement in accordance with the invention some phase-boosting characteristics can be obtained which are important for improving the system dynamic response (phase margin) even if only a simple integrator is used as the outer loop compensator for voltage regulation.

More specifically, by using a hybrid ramp compensation arrangement or technique in accordance with the invention, two important benefits can be obtained. First, a flat, unity gain closed loop frequency response can be easily obtained through outer loop compensation, and, second, the low frequency pole can be moved toward a higher frequency. In other words, a reduced phase lag or increased phase margin can be obtained below the bandwidth of the switching regulator. These performance benefits are in sharp contrast with the external ramp approach discussed above in connection with FIG. 3A in which the system cannot be well damped due to the double pole peaking characteristic discussed above because high-Q closed loop performance implies low phase margin and the peaking will move toward lower frequencies, degrading performance, with increasing external ramp slope/amplitude; a trade-off requiring sensitive tuning to obtain even marginal performance which is eliminated by the invention. Similarly, these performance benefits are in sharp contrast with the internal ramp compensation arrangement discussed above in connection with FIG. 4A, there is a low-frequency dominant pole which causes gain and phase drop; resulting in inferior and unacceptable performance.

The performance of the converters of FIGS. 3A and 4A are included in FIG. 5C for comparison and to illustrate how cancellation of the problems associated with and characteristic of the external and internal ramp approaches to avoiding ripple oscillation instability is achieved. Thus, virtually the sole difficulty associated with the converter of FIG. 5A is that it employs direct current sensing and requires high sampling rate and high resolution of A/D converters to avoid the effects of limit cycle oscillation and thus represents a substantial and unexpected improvement in performance through a counter-intuitive combination of theoretically effective but unacceptable and/or impractical approaches to the problem of ripple oscillation instability.

Figure 6A:
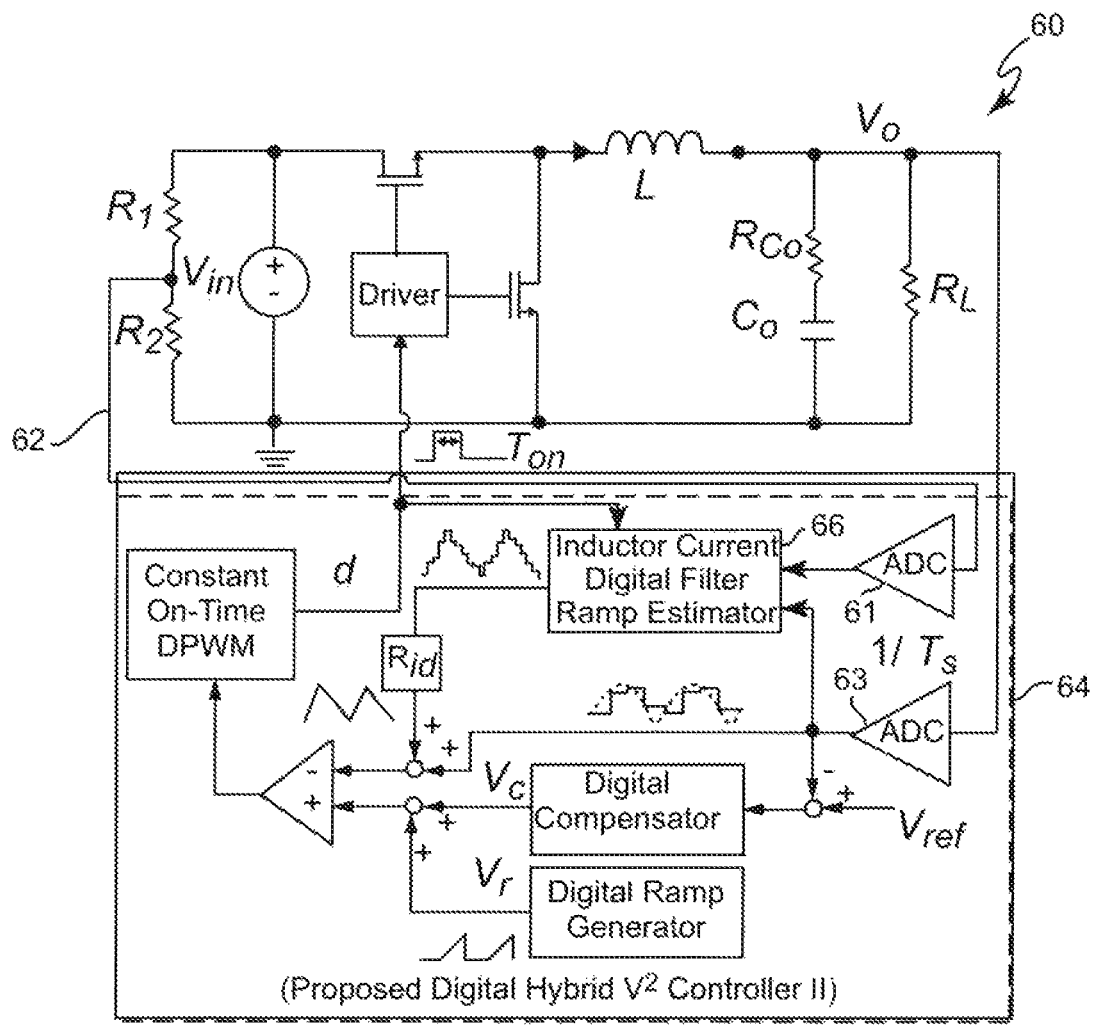
FIG. 6C illustrates waveforms useful in understanding digital inductor current estimation drift in the context of the second embodiment of the invention.

It has also been found that the performance of the converter arrangement of FIG. 5A is unexpectedly insensitive to inaccuracy of current sensing and distortion. Thus it has been found unnecessary to directly monitor the inductor current and that the inductor current can be estimated in various ways. An exemplary current estimation technique will now be discussed in connection with FIG. 6A. FIG. 6A schematically illustrates a second embodiment 60 of the invention as applied to a buck converter. The buck converter section is identical to that of FIG. 5A except that no inductor current sensing is provided and a connection 62 is provided to monitor the power input voltage Vin. Connection 62 is illustrated as being connected to a voltage divider circuit which is preferred to cause the voltage on connection 62 to approximate Vo since the input voltage for buck converters and some other topologies can be varied over a wide range. (In order to protect the circuitry, the maximum input voltage should be divided into the operating voltage ranges of the circuitry.)

While voltage Vin is ideally and theoretically constant, any voltage source will exhibit a finite internal resistance. Therefore, Vin will be reduced with increasing current drawn and which passes through the inductor. By the same token, the inductor current will be a function of the difference between Vin and Vo. Therefore, while Vo will also fluctuate in accordance with the total ripple, as discussed above, and in response to load transients, Vin−Vo will be approximately proportional to the inductor current and is entirely sufficient information for estimation of the inductor current when a compensation arrangement in accordance with the basic principles of the invention as described above is employed. Thus a ramp can be generated as an estimation of the inductor current and, moreover, if sampling is synchronized with the switch driver circuit or a digital pulse width modulator (DPWM) or the like circuit controlling it (e.g. to alter the off-time and switching frequency in a constant on-time control arrangement) using, for example, signal d, inductor current estimation and ramp generation can be performed based on a single sample of Vin per switching cycle. Therefore, a high sampling rate A/D converter is not required. Further, since it is only necessary for the ramp signal to be large enough not to be dominated by the capacitor ripple as the value of the filter capacitor is reduced in order to avoid ripple oscillation instability, high resolution of the A/D converter is not required.

Thus, as compared with the hybrid digital controller 52 of the first embodiment of the invention described above, the hybrid digital controller 64 of the second embodiment includes the same external ramp generator and digitization and compensation of the output voltage and total ripple as described above but substitutes an inductor current ramp estimator 66, preferably in the form of a digital filter for ramp generation, responsive to an input of Vin information as well as an input of the digitized output voltage and total ripple for the direct inductor current sensing arrangement of hybrid controller 52. Accordingly, the second embodiment of the invention provides the important advantage of avoiding direct inductor current sensing which is particularly difficult at low voltages and high currents which are currently being increasingly required and foreseeable. All of the performance and other benefits of the first embodiment of FIG. 5A are retained in this second embodiment since the estimated inductor waveform is substantially the same and potentially more nearly ideal although based on different initial information (e.g. the input voltage rather than a direct measurement of inductor current). Moreover, the ESR or of the switching capacitor is now irrelevant and ripple oscillation instability is avoided even if the capacitor is an ideal capacitor with zero ESR. The actual equivalent resistance of the inductor is also irrelevant since the magnitude of the estimated inductor current ramp can be easily adjusted.

Figure 6B:
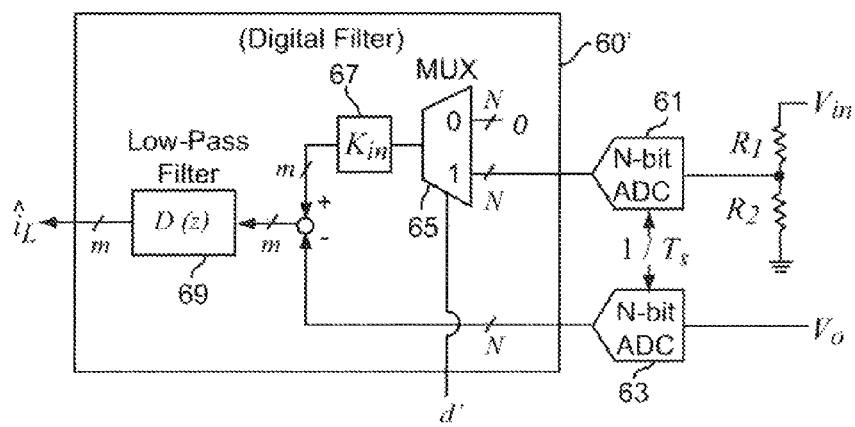

A preferred digital filter for use in the second embodiment of the invention is illustrated in FIG. 6B. Inputs from the exemplary voltage divider comprising resistors $R_1$ and $R_2$ of FIG. 6A and Vo to respective A/D converters (ADCs) are illustrated to the left of FIG. 6B. The exemplary synchronization signal d' is shown being input at the bottom of FIG. 6B. Synchronization signal d' is applied to control a multiplexer 65 which passes either the n-bit digital output of A/D converter 61 or zero when d' equals 1 (corresponding to the top switch 12 of FIG. 1B being conductive) or zero (corresponding to the top switch 12 being open), respectively. The multiplexer 65 output is then provided to a digital multiplier 67 which provides an adjusted M-bit value to allow the magnitude of the voltage corresponding to Vin to be adjusted by a factor of $K_{in}$. If the voltage divider outputs a voltage approximating Vo, $K_{in}$ can conveniently be approximately one and potentially omitted. Since $K_{in}$ only affects the slew rate of the rising portion of the estimated inductor current, changing $K_{in}$ will cause increased drift due to a volt-second imbalance and is thus not equivalent to changing $R_i$. In any case, Vo is then subtracted from the resulting value and the result of the subtraction applied to a low-pass digital filter 69. Since –Vo or a value representing Vin–Vo are alternately applied to digital low pass filter 69 in synchronism with signal d, the output of the digital low pass filter (which, in practical implementations, will be clocked) will be a stepped ramp corresponding to an estimate of the inductor current.

Figure 6C:
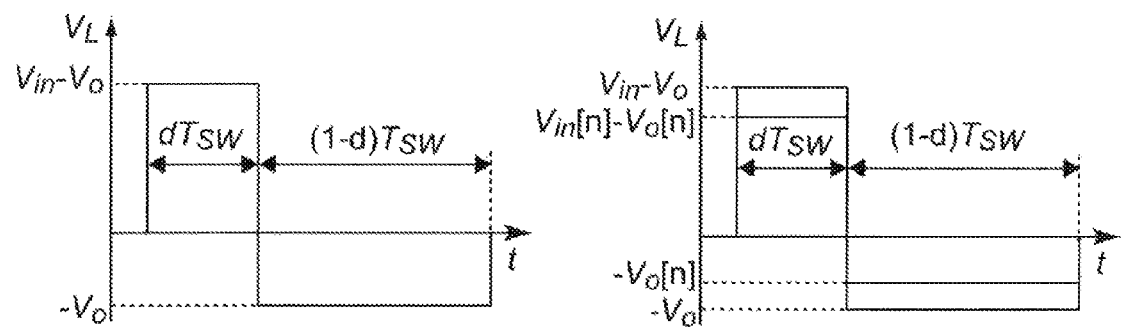

However, digital estimation of virtually any value is inherently subject to drift; in the case of estimation of inductor current, due to a volt second imbalance over a switching cycle due to quantization, finite A/D converter sampling rates and finite A/D converter resolution as illustrated in FIG. 6C. Waveform a on the left of FIG. 6C is an ideal balanced waveform of the value input to low pass filter 69 of FIG. 6B. The product of the voltage and the duration of each of the voltages (Vin–Vo) and –Vo are the same and are thus balanced. However, when Vin and Vo are quantized, the voltages may vary from the ideal as depicted in waveform b by voltages Vin(n) and Vo(n) and the products of the voltages (Vin(n)–Vo(n)) and –Vo(n) and their durations become unbalanced even though the durations remain the same since they are synchronized to the switch drivers or the DPWM as discussed above. Accordingly, unless compensated, the estimated inductor current ramp will drift in voltage with each unbalanced cycle unless compensation is provided.

Figure 7A:
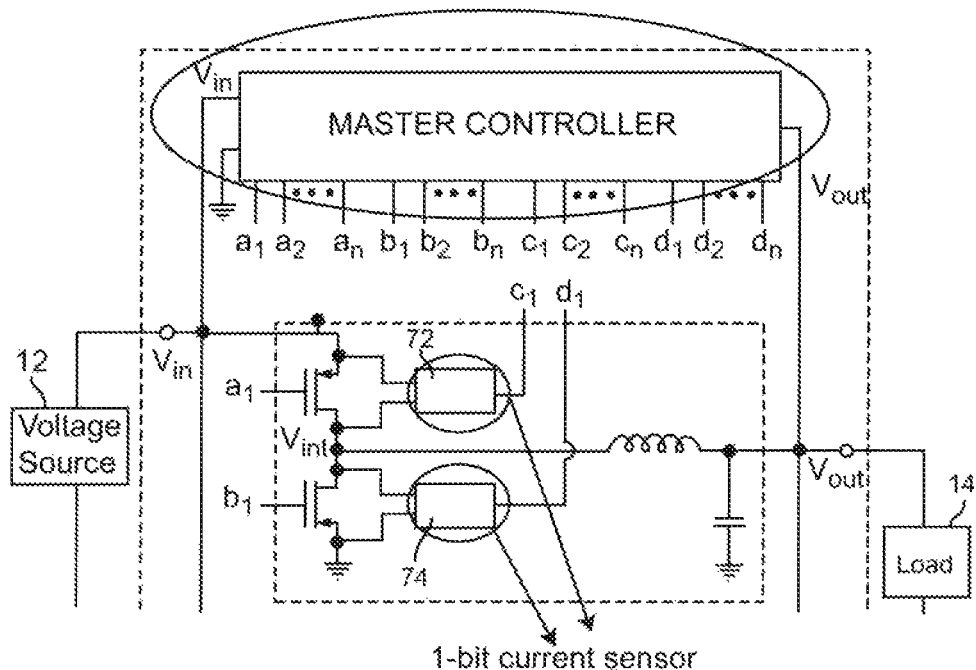
FIGS. 7A, 7B and 7C illustrate a known counter-based current estimation technique.
Figure 7B:
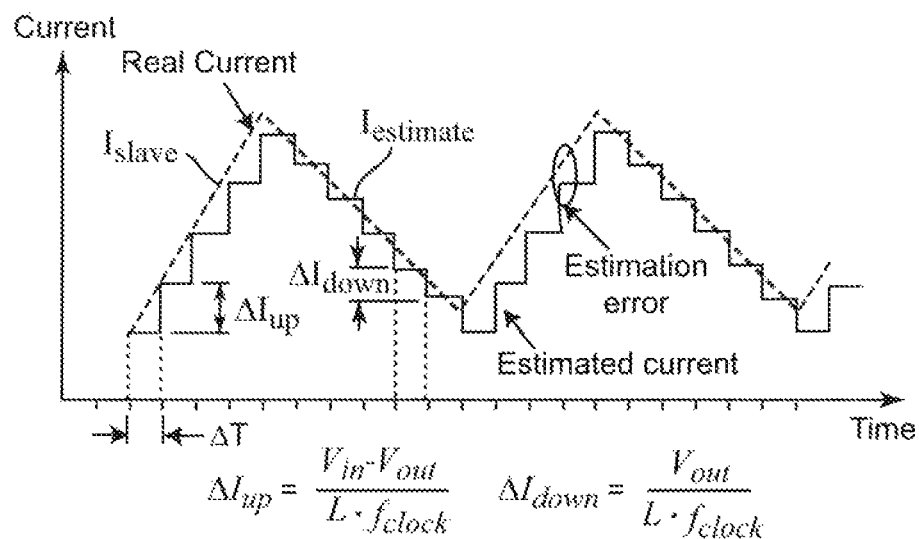
Figure 7C:
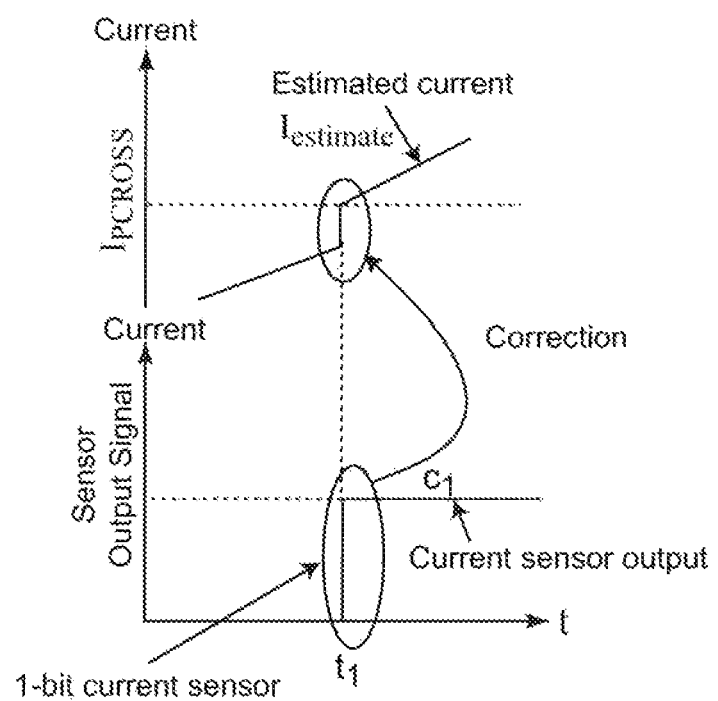

An understanding of the difficulties of drift compensation can be facilitated by reference to FIGS. 7A-7C which correspond to U.S. Pat. No. 6,031,361 which is hereby incorporated by reference for a more detailed discussion. FIG. 7A illustrates a single phase of a potentially multi-phase buck converter connected to a master controller. Current sensors 72, 74 are provided in parallel with the top and bottom switches and sense a voltage developed across these switches when conductive as a measure of the current conducted by the switches. For hardware simplification, sensors 72, 74 have only a single bit resolution (e.g. 1 or 0 valued output) depending on whether or not the current exceeds a threshold illustrated as $I_{PCROSS}$. For example, in FIG. 7C, the single bit current sensor output is changing from low (0) to high (1) at time $t_1$. At that instant, the real inductor current is $I_{PCROSS}$. However, due to the sampling and quantization effects, some estimation error may exist to cause the estimated current to be lower than the actual current. Since the actual current is known at instant $t_1$, the estimated current can be corrected to the actual current to avoid drift or divergence of the estimation from the actual current. Thus when the estimation and the actual current are found to diverge, a counter is incremented or decremented to perform a correction of the estimation to bring the estimation error to zero at every switching cycle. However, a major drawback of this arrangement is that at high load where the current sensors consistently indicate a current above the threshold, no correction can be made, drift will resume and the estimate will diverge from the actual current. This arrangement also suffers from the drawbacks that actual current information is required even if the sensors are simplified to one-bit sensors and, importantly, the threshold must be critically tuned to achieve cancellation of drift.

To avoid drift of the current estimation in the embodiment of FIG. 6A while overcoming the problem of known estimation drift correction techniques such as that discussed above in connection with FIGS. 7A-7C, a perfecting feature of the second embodiment of the invention will now be discussed in connection with FIG. 8A. It should also be understood that while this arrangement for estimation of a varying value is considered particularly suitable for application to a $V^2$ control architecture for a switched power converter, particularly since it does not require actual current information or information about the actual value of the estimated parameter to compensate for estimation drift, it is also applicable to any circumstance where a varying value that may or may not be difficult to measure can be approximated by a triangular waveform having respective rising and falling ramp portions.

Figure 8A:
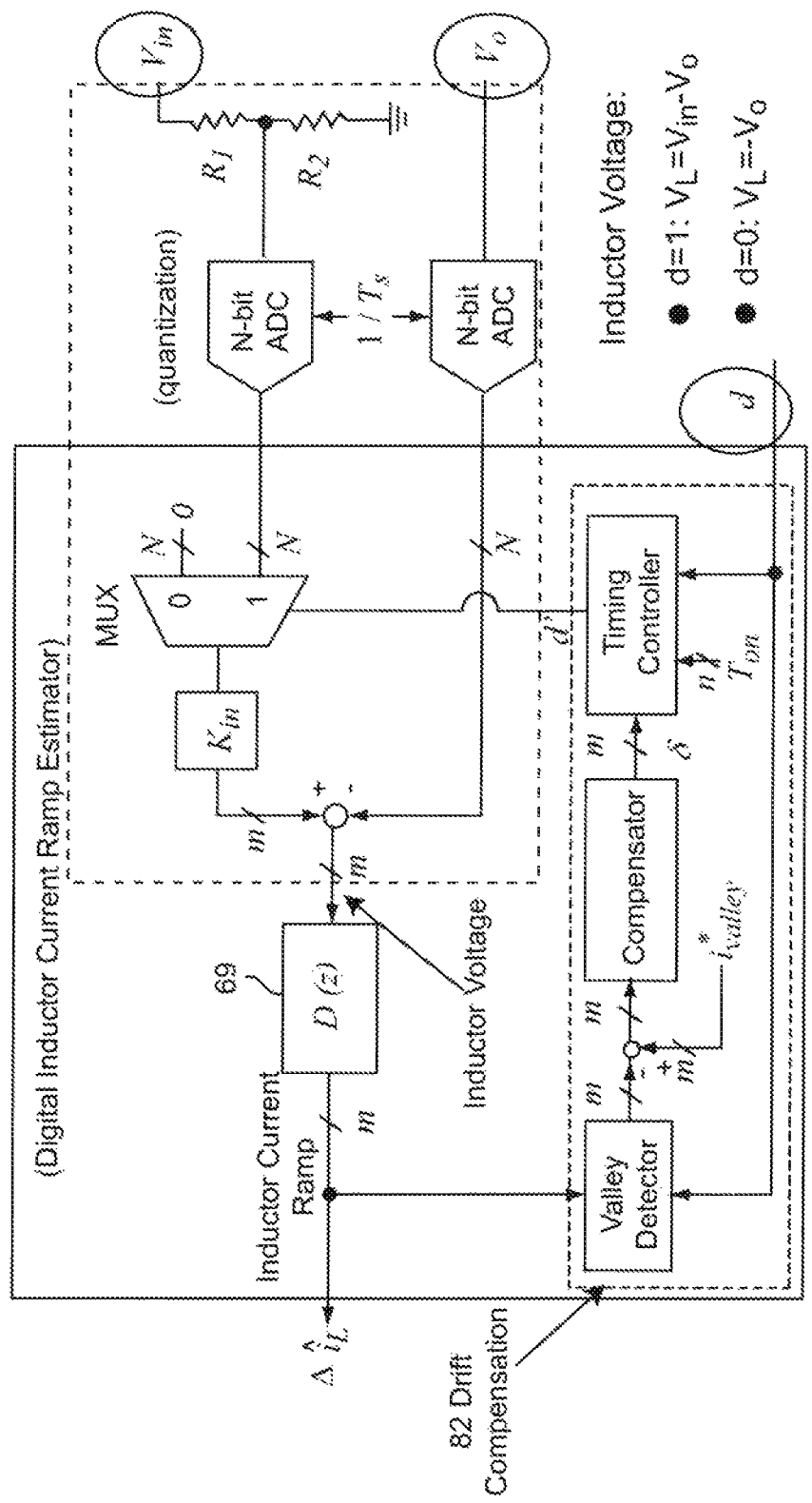
FIGS. 8A and 8B illustrates a current ramp estimator and waveforms produced thereby in accordance with a perfecting feature of the second embodiment of the invention.

It will be helpful to compare FIG. 8A with FIG. 6B. It will be recalled that the digital filter 60' of FIG. 6B is synchronized to switch control signal d which was applied to multiplexer 65 to provide either zero or a digitized value of Vin as an output thereof. The drift compensation arrangement 82 of FIG. 8 receives signal d and essentially performs an adjustment to obtain an adjusted synchronization signal d' to vary the duty cycle of the relative durations of the rising and falling ramp portions of the triangular waveform. This is achieved by simply detecting a valley or minimum of the estimated waveform and subtracting the estimated value at that value of minimum from an input desired current value $i^*_{valley}$ value which is presumably constant for the present preferred application but which could be varied in other applications. This difference is the estimation error as depicted at 90 in FIG. 8B. The magnitude of the estimation error is provided to a compensator which is essentially a multiplier to control the magnitude of the compensation to be made in the next switching cycle (e.g. to avoid excessive correction which may cause oscillation/instability of the correction). The output of the compensator is than applied to the timing controller which also receives an input representing the duration of the on-time, $T_{on}$, of top switch 12. The timing controller then lengthens or shortens $T_{on}$ to increase or decrease the number of steps in the positive-going portion of the estimated ramp waveform and correspondingly decrease or increases the number of steps in the negative-going portion of the estimated ramp waveform to bring the estimation error to substantially zero over a small number of switching cycles as shown in FIG. 8B.

Figure 8B:
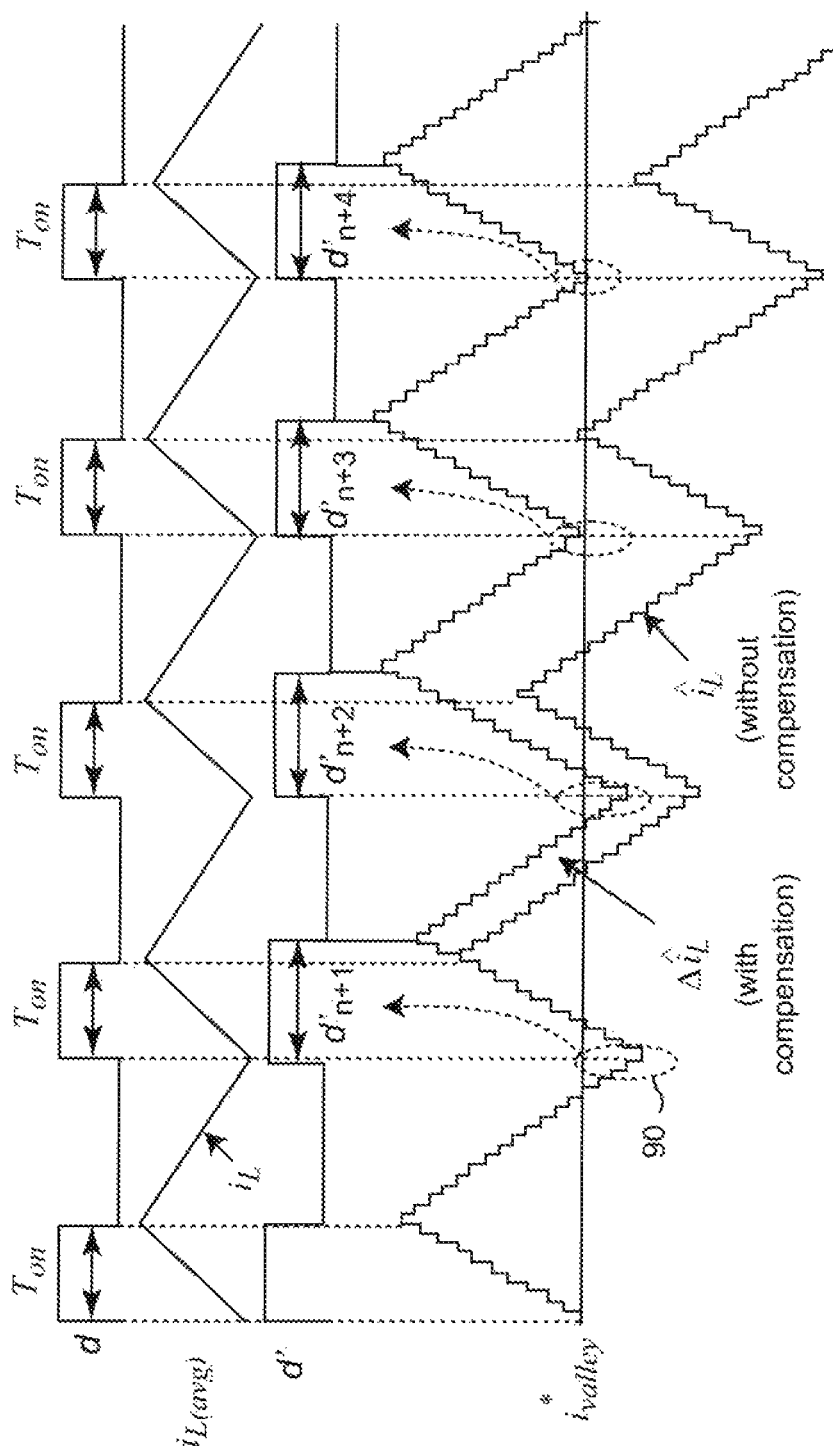

It should be recognized from FIG. 8B that the drift compensation remains synchronized to signal d and d' differs therefrom only at the trailing edge. It should also be appreciated that no information in regard to the actual current is required but only an input set-point corresponding to the minimum inductor current. However, it should be understood that only the current ripple (ramp) is estimated and all the DC error between the set point and the estimated current will be canceled by the drift compensation described above.

Figure 9A:
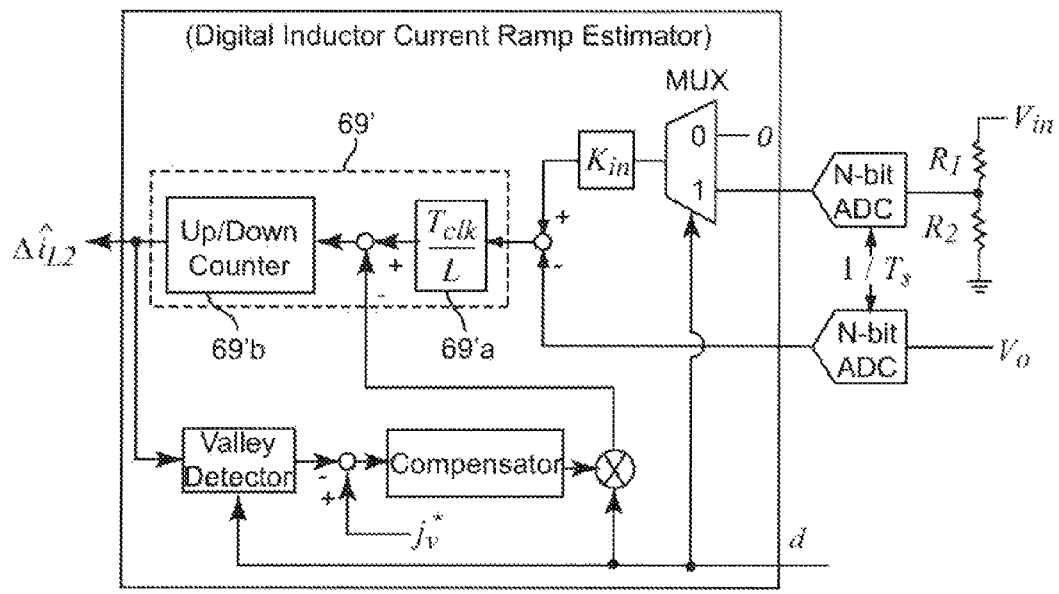
FIGS. 9A and 9B illustrates an alternative current ramp estimator and waveforms produced thereby in accordance with a perfecting feature of the second embodiment of the invention.
Figure 9B:
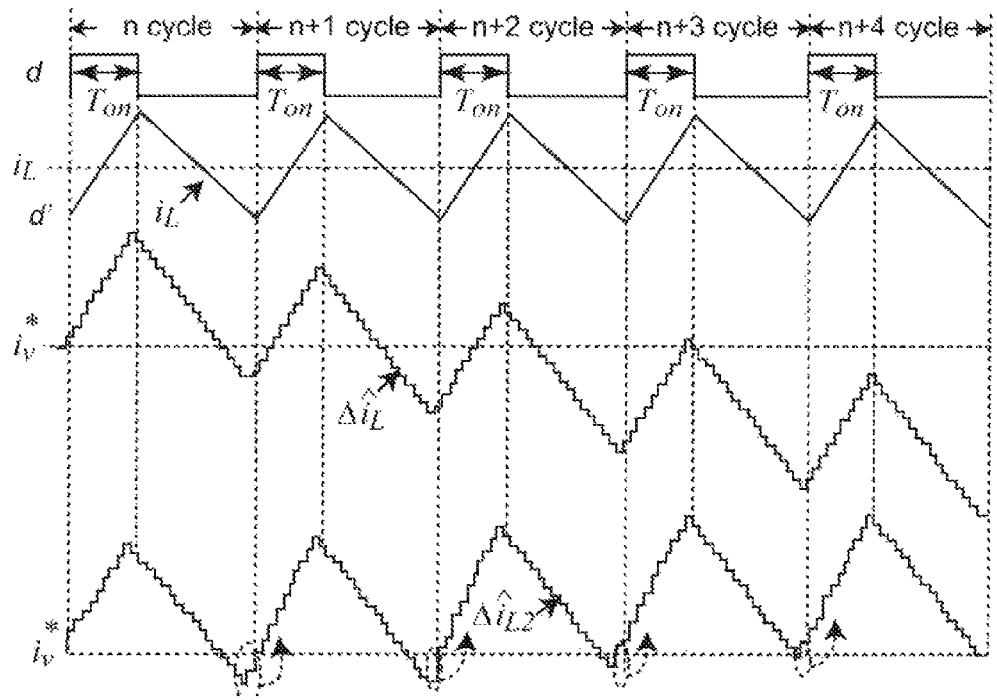

An alternative drift compensation technique (which may also be used in other applications) is illustrated in FIGS. 9A and 9B. This alternative drift compensation technique varies slew rate rather than duty cycle such that the current estimation can remain synchronized to both the leading and trailing edges of synchronization/switch control signal d. In FIG. 9A the low pass filter 69' is illustrated as comprising a multiplier 69'a providing a parameter for controlling a clock and clocked up-down counter 69'b. The multiplication factor provided by multiplier 69'a is simply a common term in the equations A-6 and A-7 for the estimated slope of the rising and falling portions of the estimated inductor current waveform as will be discussed below and is only critical to the extent of being sufficiently large to stabilize the voltage regulator system. (The same constituent counter and multiplier elements 69'a and 69'b are preferably provided in the low pass filter D(z) 69 of FIG. 8A.) The Vin and Vo inputs are applied as described above in regard to FIGS. 6B and 8A and the synchronization input d is applied as described above in regard to FIG. 6D and as distinguished from FIG. 8A since the duty cycle of the estimation remains constant and synchronized with d in this alternative technique. A valley detector and compensator are provided as described above in connection with FIG. 8A. However, in this alternative technique, the output of the compensator is multiplied by (e.g. synchronized with) signal d and the result (e.g. compensator output) thus periodically provided to be subtracted from the output of multiplier 69'a and the result provided to the up-down counter 69'b to develop a slew rate corrected ramp waveform that compensates for drift.

It should be noted that the compensation provided by the compensator of FIG. 9A may be different from that provided in FIG. 8A. For example, proportional-integral controllers may be used to improve the convergence rate and to eliminate oscillations.

Figure 10:
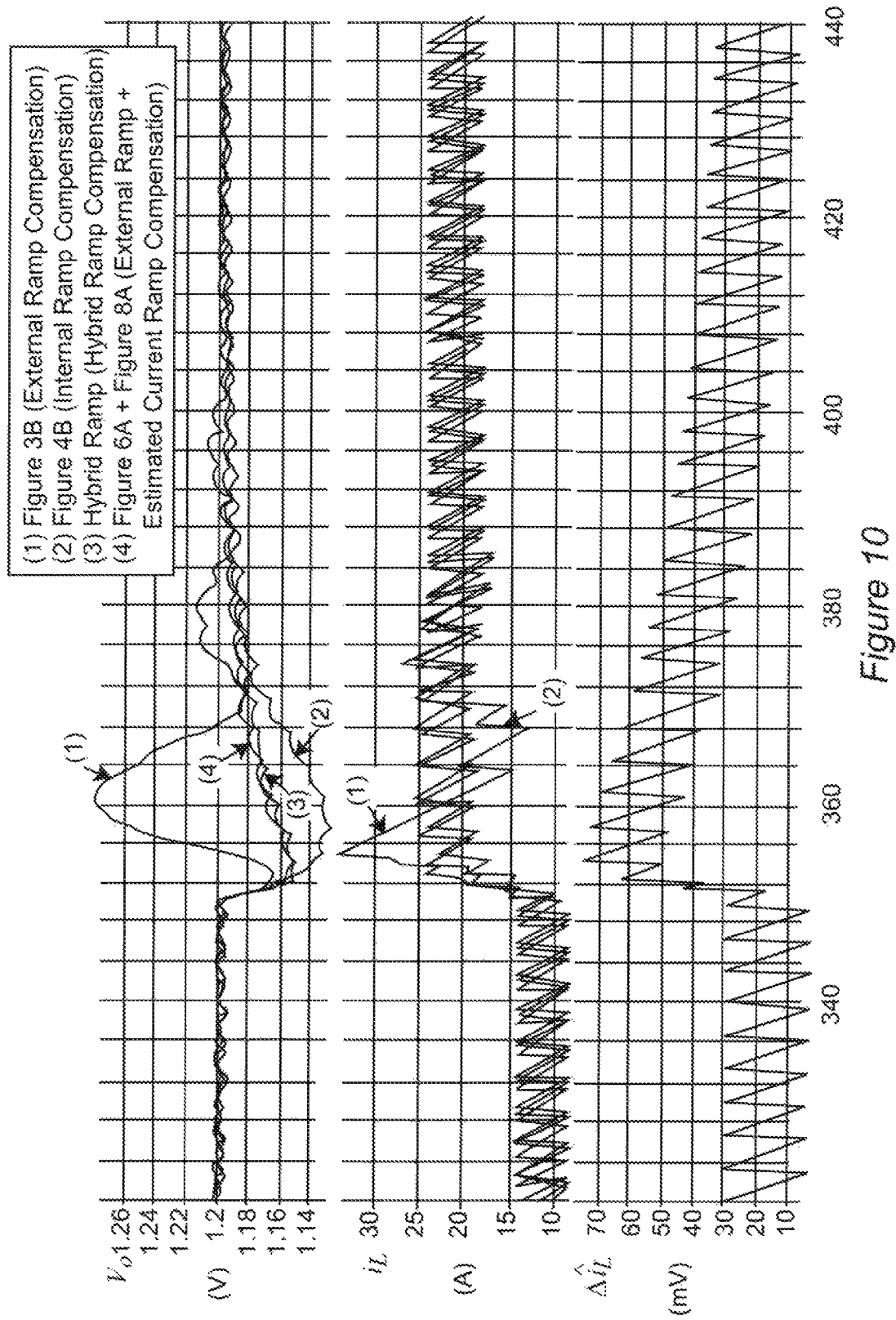
FIG. 10 illustrates comparative performance of the first and second embodiments and the known arrangements of FIGS. 3A and 4A and FIG. 11 illustrates simulation results of current estimation using different drift compensators.

FIG. 10 illustrates the simulated comparative load transient performance of the power converter circuits with $V^2$ control architecture and ripple oscillation instability avoidance arrangements of FIGS. 3A (waveform 1), 4A (waveform 2), 5A (waveform 3) and 6A including the estimated current ramp of FIG. 8 (waveform 4). It can be readily appreciated that the performance of the first and second embodiments of the invention are far superior to the unacceptable performance of known external ramp techniques (which are not well-damped and requires critical adjustment for load transients) or internal ramp techniques (which have inferior and unacceptable load transient performance and require high resolution and high sampling rate A/D converters as well as being inadequately damped) for avoiding ripple oscillation instability and that inductor current estimation with drift compensation in accordance with the invention is significantly superior to the performance that can be achieved with the counterintuitive combination of internal and external ramps even with difficult direct monitoring of inductor current. Further, the diminution of ESR in higher quality and smaller valued filter capacitors is made irrelevant to the efficacy and reliable application of $V^2$ control architecture to power converters to enhance transient response and support the use of such smaller filter capacitors, particularly in point-of-load applications now required for many integrated circuits of current and foreseeable designs. In the interest of completeness, the following formal analysis of the invention is provided establishes the effectiveness of the invention to provide high levels of performance using a $V^2$ control architecture in power converters even where the ESR of the filter capacitance is vanishingly small.

FIG. 6A shows a buck converter with the digital current ramp estimator. Based on the DPWM signal d, the inductor voltage $V_L$ can be derived as follows.

$$V_L = \begin{cases} V_{in} - V_o & \text{for } d = 1 \\ -V_o & \text{for } d = 0 \end{cases} \tag{A-1}$$

where $V_{in}$ is the input voltage, and $V_o$ is the output voltage. It should be noted that the voltage drops of the power transistor and the wire connection are ignored for simplifications. By measuring the inductor voltage $V_L$ with analog-to-digital converters (ADCs), the inductor current ramp can be estimated by using a simple counter as follows.

$$\Delta i_L[k] = \Delta i_L[k-1] + \frac{v_L[k]}{L} \cdot T_{clk} \tag{A-2}$$

$$v_L[k] = d \cdot v_{in}[k] - v_o[k] \tag{A-3}$$

where $\Delta i_L[k]$ is the estimated current ramp at the k-th sample instant, $v_L[k]$ is the sampled inductor voltage at the k-th sample instant, $v_{in}[k]$ is the sampled input voltage at the k-th sample instant, $v_o[k]$ is the sampled output voltage at the k-th sample instant, $T_{clk}$ is the sampling time for the estimator, and L is the inductance. During the steady state, the initial and final values of the inductor current within one switching cycle should be equal as follows.

$$\Delta i_L^*\left[k_n + \frac{T_{sw}[n]}{T_{clk}}\right] = \Delta i_L^*[k_n] + \sum_{x=1}^{\frac{T_{sw}[n]}{T_{clk}}} \left(\frac{v_L[k_n + x]}{L} \cdot T_{clk}\right) \tag{A-4}$$

$$= \Delta i_L^*[k_n]$$

where $k_n$ is the initial sampling instant for the n-th switching cycle, $\Delta i_L^*$ is the ideal estimated current ramp, and $T_{sw}[n]$ is the switching period of the n-th switching cycle. However, due to the quantization and finite sampling effects, the volt-second unbalance issue is found as shown below by assuming the input and output voltages remaining constant within one switching cycle.

$$\sum_{x=1}^{\frac{T_{sw}[n]}{T_{clk}}} \left(\frac{v_L[k_n + x]}{L} \cdot T_{clk}\right) = \left[\frac{(v_{in}[k_n] - v_o[k_n])}{L} \cdot T_{clk} \cdot \text{int}\left(\frac{T_{on}[n]}{T_{clk}}\right) - \frac{v_o[k_n]}{L} \cdot T_{clk} \cdot \text{int}\left(\frac{T_{off}[n]}{T_{clk}}\right)\right] \neq 0 \tag{A-5}$$

where int(m) is the integer part of variable m, and $T_{on}[n]$ and $T_{off}[n]$ represent the steady-state on-time and off-time of the n-th switching cycle, respectively. The estimation error of each switching cycle will be accumulated to cause a drift problem. FIG. 8B shows the illustrated waveforms of the estimation drift problem due to the volt-second unbalance issue. In FIG. 6A, a one-bit current sensor can be utilized to correct the estimation error and to avoid the drift issue. In this innovation, a drift compensation strategy is proposed without sensing the real current.

Define the current rising slew rate $i_r$, the current falling slew rate $i_f$, the sampled on-time $t_{on\_d}$ and the sampled off-time $t_{off\_d}$ as the following equations:

$$i_r[k_n] = \frac{(v_{in}[k_n] - v_o[k_n])}{L} \cdot T_{clk} \quad \text{(A-6)}$$

$$i_f[k_n] = \frac{-v_o[k_n]}{L} \cdot T_{clk} \quad \text{(A-7)}$$

$$t_{on\_d}[n] = \text{int}\left(\frac{T_{on}[n]}{T_{clk}}\right) \quad \text{(A-8)}$$

$$t_{off\_d}[n] = \text{int}\left(\frac{T_{off}[n]}{T_{clk}}\right) \quad \text{(A-9)}$$

then the estimation error $\Delta i_{L\_err}[n]$ of the n-th switching cycle can be derived as follows.

$$\Delta i_{L\_err}[n] = \Delta i_{L\_err}[n-1] + \left(\Delta i_L\left[k_n + \frac{T_{sw}[n]}{T_{clk}}\right] - \Delta i_L[k_n]\right) \quad \text{(A-10)}$$

$$= \Delta i_{L\_err}[n-1] + (i_r[k_n] \cdot t_{on\_d}[n] + i_f[k_n] \cdot t_{off\_d}[n])$$

From (A-6)-(A-10), the estimation error is caused by the quantization error of input and output voltages, the inductance variations, and the sampling error of the on-time and off-time. In order to eliminate the estimation error and to avoid the drift issue, a compensation strategy is required. There are several ways to compensate the estimation error: adjusting the sampled on-time or off-time, adjusting the rising slew rate $i_r$, or adjusting the falling slew rate $i_f$.

FIG. 8A shows one possible implementation block diagram for solving the estimation drift problem by adjusting the sampled on-time $t_{on\_d}$. The initial value of the estimated current of the n-th switching cycle can be defined by using a preset valley current reference $i_v^*$, which can be set to zero for current ramp estimation without dc offset. By assuming the initial estimation error $\Delta i_{L1\_err}$ is zero before the n-th switching cycle as shown in FIG. 8B, and keeping the current rising and falling slew rates as constant values $i_r$ and $i_f$, then the estimation error at the n-th switching cycle can be derived as follows.

$$\Delta i_{L1}[k] = i_v^* \quad \text{(A-11)}$$

$$\Delta i_{L1\_err}[n-1] = 0 \quad \text{(A-12)}$$

$$t'_{on\_d}[n] = t_{on\_d}[n] \quad \text{(A-13)}$$

$$t'_{off\_d}[n] = t_{off\_d}[n] \quad \text{(A-14)}$$

$$\Delta i_{L1\_err}[n] = (i_r \cdot t'_{on\_d}[n] + i_f \cdot t'_{off\_d}[n]) \quad \text{(A-15)}$$

By using a proportional gain $K_{p1}$ as the compensator, the sampled on-time and off-time can be adjusted based on the estimation error as shown below.

$$t'_{on\_d}[n+1] = t_{on\_d}[n+1] - \delta[n] \quad \text{(A-16)}$$

$$= t_{on\_d}[n+1] - K_{p1} \cdot \Delta i_{L1\_err}[n]$$

-continued $$t'_{off\_d}[n+1] = t_{off\_d}[n+1] - \delta[n] \quad \text{(A-17)}$$

$$= t_{off\_d}[n+1] + K_{p1} \cdot \Delta i_{L1\_err}[n]$$

Then the estimation error in the next switching cycle can be derived based on (A-15)-(A-17).

$$\Delta i_{L1\_err}[n+1] = \Delta i_{L1\_err}[n] + \quad \text{(A-18)}$$

$$(i_r \cdot t'_{on\_d}[n+1] + i_f \cdot t'_{off\_d}[n+1])$$

$$= [2 - (i_r - i_f) \cdot K_{p1}] \cdot \Delta i_{L1\_err}[n]$$

By choosing $K_{p1}$ as follows $$K_{p1} > \frac{1}{(i_r - i_f)} \quad \text{(A-19)}$$

The estimation error can be converged. However, in order to improve the convergence rate and to eliminate the oscillations and the steady-state estimation error, different compensators can be used, such as proportional-integral (PI) controllers.

FIG. 9A shows another possible implementation block diagram for solving the estimation drift problem by adjusting the current rising slew rate $i_r$. The initial value of the estimated current of the n-th switching cycle can be defined by using a present valley current reference $i_v^*$, which can be set to zero for current ramp estimation without dc offset. By assuming the initial estimation error $\Delta i_{L2\_err}$ is zero before the n-th switching cycle as shown in FIG. 9B, and keeping the sampled on-time and off-time as constant values $t_{on\_d}$ and $t_{off\_d}$, and keeping the current falling rate as constant value $i_f$, then the estimation error at the n-th switching cycle can be derived as follows.

$$\Delta i_{L2}[k_n] = i_v^* \quad \text{(A-20)}$$

$$\Delta i_{L2\_err}[n-1] = 0 \quad \text{(A-21)}$$

$$i'_r[n] = i_r[k_n] \quad \text{(A-22)}$$

$$\Delta i_{L2\_err}[n] = (i'_r[n] \cdot t_{on\_d} + i_f \cdot t_{off\_d}) \quad \text{(A-23)}$$

By using a proportional gain $K_{p2}$ as the compensator, the sampled on-time and off-time can be adjusted based on the estimation error as shown below.

$$i'_r[n+1] = i_r[k_{n+1}] - K_{p2} \cdot \Delta i_{L2\_err}[n] \quad \text{(A-24)}$$

Assume that the sampled input and output voltages are the same during the steady state, that is $i_r[k_{n+1}] = i_r[k_n]$. Then the estimation error in the next switching cycle can be derived based on (A-23)-(A-24).

$$\Delta i_{L2\_err}[n+1] = \Delta i_{L2\_err}[n] + (i'_r[n+1] \cdot t_{on\_d} + i_f \cdot t_{off\_d}) \quad \text{(A-25)}$$

$$= [2 - K_{p2} \cdot t_{on\_d}] \cdot \Delta i_{L2\_err}[n]$$

By choosing $K_{p2}$ as follows $$K_{p2} > \frac{1}{t_{on\_d}} \quad \text{(A-26)}$$

Figure 11:
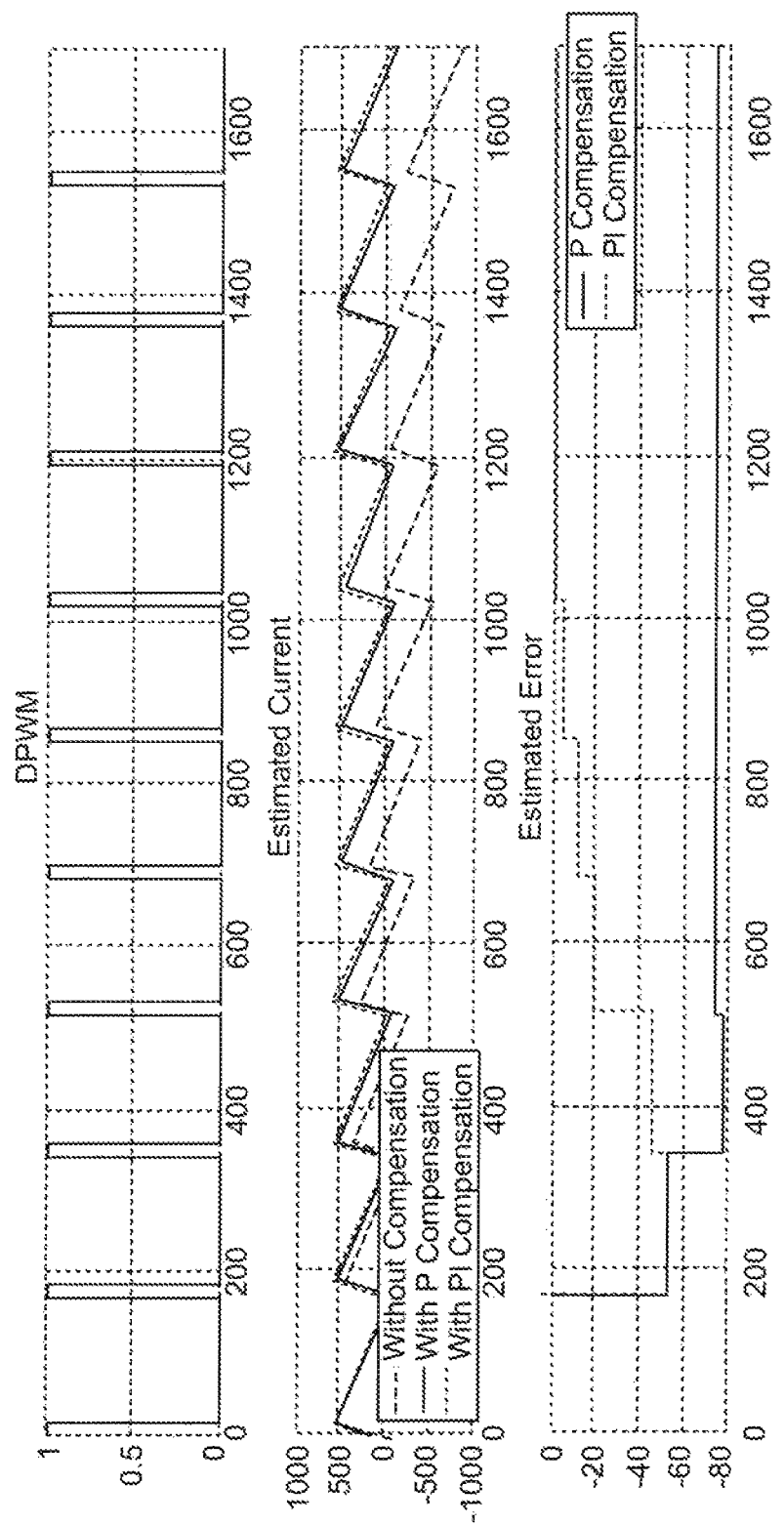

The estimation error can be converted. However, in order to improve the convergence rate and to eliminate the oscillations and the steady-state estimation error, different compensators can be used, such as proportional-integral (PI) controllers. FIG. 11 shows the simulation results of the current ramp estimation with different drift compensators.

In view of the foregoing, it is clearly seen that the invention provides a practical, digitally implemented $V^2$ control architecture, particularly for buck converters and a technique and circuit for avoiding pulse skipping ripple oscillation instability without the drawbacks of known techniques and circuits and which can be achieved without inductor current sensing. Further, the invention provides a power converter having a $V^2$ control architecture of improved transient response without requiring high sampling rate or high resolution A/D converters.

While the invention has been described in terms of a two embodiments and a perfecting feature that can be implemented in several variant forms, those skilled in the art will recognize that the invention can be practiced with modification within the spirit and scope of the appended claims.

The invention claimed is:

1. A switched power converter comprising
   switches for supplying input voltage power to an inductor, and
   a feedback circuit for controlling said switches in accordance with a signal representing an output voltage and an output current of said power converter, said feedback circuit comprising
      an external ramp generator for adding a first ramp waveform to said signal representing said output voltage, said first ramp waveform having a slope which produces approximately unity gain of said power converter at a switching frequency above a frequency at which said external ramp generator causes a peak in gain of said power converter, and
      an internal ramp generator for adding a second ramp waveform to said signal representing said output current, said second ramp waveform having a magnitude which produces approximately unity gain of said power converter at a switching frequency above a frequency at which said internal ramp generator causes a minimum in gain of said power converter.

2. A power converter as recited in claim 1, wherein said internal ramp generator estimates current in said inductor from said input voltage.

3. A power converter as recited in claim 2, wherein said internal ramp generator detects minima in said ramp waveform generated by said internal ramp waveform generator and adjusts a positive-going portion of said ramp waveform to compensate for drift.

4. A power converter as recited in claim 3, wherein said positive-going portion of said ramp waveform generated by said internal ramp generator is adjusted in duration.

5. A power converter as recited in claim 3, wherein said positive-going portion of said ramp waveform generated by said internal ramp generator is adjusted in slope or slew rate.

6. A power converter as recited in claim 3, wherein said internal ramp generator includes a counter for adjusting said positive-going portion of said ramp waveform generated by said internal ramp generator.

7. A power converter as recited in claim 1, wherein said internal ramp generator is responsive to a direct measurement of inductor current.

8. A power converter as recited in claim 7, wherein said direct measurement of inductor current is represented by a voltage developed on a direct current resistance of said inductor.

9. A digital triangular waveform generator which closely matches durations of rising and falling portions of a triangular waveform to a duty cycle of a control signal, said digital triangular waveform generator comprising a multiplexer and a low pass filter, said multiplexer providing a first input parameter value or a second input parameter value to said low pass filter in synchronism with a periodic control signal, wherein a DC level of said triangular waveform is adjusted by comparison of a value of said triangular waveform at a detected minimum of said triangular waveform with a reference value to compensate for drift by adjustment of a duty cycle or a slew rate of portions of said triangular waveform at a frequency of said control signal.

10. A digital triangular waveform generator as recited in claim 9 wherein a duty cycle of said control signal is adjusted by said comparison.

11. A digital triangular waveform generator as recited in claim 9 wherein a slew rate of a rising portion of said triangular waveform is adjusted by said comparison.

12. A digital triangular waveform generator as recited in claim 9 wherein said low pass filter includes a counter.

13. A digital triangular waveform generator as recited in claim 9 wherein said second input parameter is a substantially fixed value.

14. A digital triangular waveform generator as recited in claim 9 wherein said first input parameter represents an input voltage to a switching voltage regulator including a $V^2$ control arrangement.

* * * * *